United States Patent
Jordan

(10) Patent No.: US 9,800,548 B2
(45) Date of Patent: Oct. 24, 2017

(54) DEVICE, SYSTEM AND METHOD FOR DEFENDING A COMPUTER NETWORK

(71) Applicant: McAfee, Inc., Santa Clara, CA (US)

(72) Inventor: Christopher J. Jordan, Leesburg, VA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/486,740

(22) Filed: Sep. 15, 2014

(65) Prior Publication Data
US 2016/0366099 A1     Dec. 15, 2016

Related U.S. Application Data

(63) Continuation of application No. 10/990,329, filed on Nov. 17, 2004, now Pat. No. 8,839,417.

(60) Provisional application No. 60/520,577, filed on Nov. 17, 2003.

(51) Int. Cl.
   G06F 21/00     (2013.01)
   H04L 29/06     (2006.01)

(52) U.S. Cl.
   CPC ...... H04L 63/0245 (2013.01); H04L 63/0227 (2013.01); H04L 63/1416 (2013.01); H04L 63/1491 (2013.01)

(58) Field of Classification Search
   None
   See application file for complete search history.

(56) References Cited

U.S. PATENT DOCUMENTS

| | | | |
|---|---|---|---|
| 5,278,901 A | 1/1994 | Shieh et al. | |
| 5,621,889 A | 4/1997 | Lermuzeaux et al. | |
| 5,987,610 A | 11/1999 | Franczek et al. | |
| 6,073,142 A | 6/2000 | Geiger et al. | |
| 6,279,113 B1 | 8/2001 | Vaidya | |
| 6,460,050 B1 | 10/2002 | Pace et al. | |
| 6,470,027 B1 * | 10/2002 | Birrell, Jr. ............... | H04L 63/02 370/310 |
| 6,609,153 B1 * | 8/2003 | Salkewicz ..................... | 709/223 |

(Continued)

OTHER PUBLICATIONS

Intrusion Detection with Data Mining, Amanda Delamer, IT-Consulting, Donau-Universitat Krems, May 30, 2002.

(Continued)

*Primary Examiner* — Maung Lwin
(74) *Attorney, Agent, or Firm* — Patent Capital Group

(57) ABSTRACT

A device, system, and method for defending a computer network are described, network communications are received by a traffic filter, which dynamically determines whether the communications include an anomaly (i.e., are "anomalous" communications), or whether the communications are normal, and do not include an anomaly. The traffic filter routes normal communications to the correct device within its network for servicing he service requested by the communications. The traffic filter routes any anomalous communications to a virtual space engine, which is configured to fake a requested service (e.g., to entice deployment of a malicious payload). Anomalous communications are analyzed using an analytical engine, which can dynamically develop rules for handling anomalous communications in-line, and the rules developed by the analytical engine can be employed by the traffic filter against future received communications.

21 Claims, 14 Drawing Sheets

(56) References Cited

U.S. PATENT DOCUMENTS

| | | | |
|---|---|---|---|
| 6,687,833 B1 | 2/2004 | Osborne et al. | |
| 6,714,970 B1 | 3/2004 | Fiveash et al. | |
| 6,725,377 B1 | 4/2004 | Kouznetsov | |
| 6,775,657 B1 | 8/2004 | Baker | |
| 6,785,821 B1 | 8/2004 | Teal | |
| 6,901,357 B1 | 5/2005 | Patiejunas | |
| 6,970,932 B1* | 11/2005 | Juster | 709/229 |
| 6,996,843 B1* | 2/2006 | Moran | G06F 21/564 706/10 |
| 7,032,114 B1 | 4/2006 | Moran | |
| 7,072,967 B1* | 7/2006 | Saulpaugh | H04L 67/16 709/201 |
| 7,107,347 B1 | 9/2006 | Cohen | |
| 7,143,444 B2 | 11/2006 | Porras et al. | |
| 7,320,140 B1* | 1/2008 | Boyer | H04N 21/2541 375/E7.009 |
| 7,331,061 B1* | 2/2008 | Ramsey | H04L 63/0218 726/11 |
| 7,386,881 B2* | 6/2008 | Swander | H04L 63/08 370/392 |
| 7,424,744 B1 | 9/2008 | Wu et al. | |
| 7,464,407 B2 | 12/2008 | Nakae et al. | |
| 7,506,155 B1 | 3/2009 | Stewart et al. | |
| 7,565,692 B1* | 7/2009 | Maria | 726/23 |
| 7,730,159 B1* | 6/2010 | Meyer | H04W 4/02 709/201 |
| 7,895,649 B1 | 2/2011 | Brook et al. | |
| 7,900,240 B2 | 3/2011 | Terzis et al. | |
| 7,941,854 B2 | 5/2011 | Baffes et al. | |
| 8,051,213 B2* | 11/2011 | Van Hensbergen | H04L 29/06 709/239 |
| 8,065,725 B2 | 11/2011 | Zheng et al. | |
| 8,356,349 B2 | 1/2013 | Brusotti et al. | |
| 8,839,417 B1 | 9/2014 | Jordan | |
| 2002/0009078 A1* | 1/2002 | Wilson | H04L 12/2856 370/389 |
| 2002/0046275 A1* | 4/2002 | Crosbie et al. | 709/224 |
| 2002/0059424 A1* | 5/2002 | Ferguson et al. | 709/226 |
| 2002/0073146 A1* | 6/2002 | Bauer et al. | 709/203 |
| 2002/0172198 A1* | 11/2002 | Kovacevic | H04N 21/4345 370/389 |
| 2003/0051163 A1* | 3/2003 | Bidaud | 713/201 |
| 2003/0101358 A1 | 5/2003 | Porras et al. | |
| 2003/0182435 A1* | 9/2003 | Redlich | C07K 14/70575 709/229 |
| 2003/0229713 A1 | 12/2003 | Hensbergen et al. | |
| 2004/0039914 A1* | 2/2004 | Barr | G06T 1/0028 713/176 |
| 2004/0068647 A1* | 4/2004 | Hariharan | H04L 63/0414 713/153 |
| 2004/0078592 A1 | 4/2004 | Fagone et al. | |
| 2004/0093513 A1 | 5/2004 | Cantrell et al. | |
| 2004/0111637 A1 | 6/2004 | Baffes et al. | |
| 2004/0114558 A1* | 6/2004 | Krishnamurthi et al. | 370/338 |
| 2004/0143758 A1* | 7/2004 | Swander | H04L 63/08 713/154 |
| 2004/0153574 A1 | 8/2004 | Cohen et al. | |
| 2004/0172557 A1 | 9/2004 | Nakae et al. | |
| 2004/0209608 A1* | 10/2004 | Kouznetsov | G06F 21/566 455/418 |
| 2004/0210645 A1* | 10/2004 | Kouznetsov | G06F 21/562 709/220 |
| 2004/0225894 A1* | 11/2004 | Colvin | G06F 21/121 726/27 |
| 2004/0230696 A1* | 11/2004 | Barach | H04L 45/00 709/238 |
| 2004/0243835 A1 | 12/2004 | Terzis et al. | |
| 2007/0058551 A1 | 3/2007 | Brusotti et al. | |

OTHER PUBLICATIONS

John D. Day, et al., "The OSI Reference Model," Proceedings of the IEEE vol. 71, No. 12, Dec. 1983.

Leiner et al., "The DARPA Internet Protocol Suite," Communications Magazine, IEEE vol. 23, Issue 3, Mar. 1985.

USPTO Oct. 30, 2007 Nonfinal Office Action from U.S. Appl. No. 12/415,653.

USPTO Jul. 18, 2008 Nonfinal Office Action from U.S. Appl. No. 10/990,329.

USPTO Feb. 1, 2010 Final Office Action from U.S. Appl. No. 10/990,329.

USPTO Oct. 25, 2010 Nonfinal Office Action from U.S. Appl. No. 10/990,329.

USPTO May 6, 2011 Final Office Action from U.S. Appl. No. 10/990,329.

USPTO Aug. 1, 2012 Nonfinal Office Action from U.S. Appl. No. 10/990,329.

USPTO Feb. 21, 2013 Final Office Action from U.S. Appl. No. 10/990,329.

USPTO Sep. 5, 2013 Nonfinal Office Action from U.S. Appl. No. 10/990,329.

"Adaptive Intrusion Detection: a Data Mining Approach," Lee et al., Kluwer Academic Publishers, 2000.

"Honeypots," Baumann et al., open systems, Diploma Thesis in Computer Science, Feb. 2002.

"Network Intrusion Detection: Evasion, Traffic Normalization, and End-to-End Protocol Semantics," Handley et al., Proceedings of the 10th USENIX Security Symposium, Aug. 13-17, 2001.

"White Paper: Honeypots," Baumann et al., Feb. 26, 2002.

"Honeynets," Brenton, Dartmout College Institute for Security Technology Studies, 2001.

"Know Your Enemy: Defining Virtual Honeynets," Honeynet Project, Jan. 27, 2003.

"Turning the tables: Loadable Kernel Module Rootkits deployed in a honeypot environment," Rose, SANS Institute InfoSec Reading Room, Early-Mid 2003.

USPTO Jan. 14, 2014 Final Office Action from U.S. Appl. No. 10/990,329.

USPTO May 15, 2014 Notice of Allowance from U.S. Appl. No. 10/990,329.

* cited by examiner

DEVICE, SYSTEM AND METHOD FOR DEFENDING A COMPUTER NETWORK

PRIORITY INFORMATION

This Application is a continuation (and claims the benefit of priority under 35 U.S.C. §120) of U.S. application Ser. No. 10/990,329, filed Nov. 17, 2004, entitled DEVICE, SYSTEM AND METHOD FOR DEFENDING A COMPUTER NETWORK, Inventor Christopher J. Jordan, which application claims the benefit of priority under 35 U.S.C. §119(e) of U.S. Provisional Application No. 60/520,577, which was filed on Nov. 17, 2003. The disclosure of both of the prior applications are considered part of (and are incorporated by reference in) the disclosure of this application in their entireties.

U.S. GOVERNMENT LICENSE RIGHTS

At least some of the subject matter of this application was made with the support of contract no. NBCHC030118 from the U.S. Department of Defense. The government has a paid-up license in this invention and the right in limited circumstances to require the patent owner to license others on reasonable terms as provided for by the terms of contract no. NBCHC030118 awarded by the U.S. Department of Defense.

FIELD OF THE INVENTION

The invention relates to defending a computer network and devices located within a computer network. More specifically, one or more embodiments of the invention relate to handling communications received and transmitted by a computer network in a manner that prevents a malicious entity from harming or gaining information about the computer network or its devices.

BACKGROUND

In recent years individuals and businesses have become increasingly dependent upon processor-based devices, such as computers and the like. Particularly, with the advent of the Internet, the use of processor-based devices connected to a network has become increasingly commonplace. In fact, many businesses have critical systems connected to public networks.

With the increased use of processor-based devices, and particularly processor-based devices connected to networks, fears associated with the security of those networks and the devices connected thereto have also increased. For example, computer users or other entities with malicious intent (e.g., hackers, etc.) may attempt to gain unauthorized access to devices connected to a public network (e.g., the Internet). Additionally, malicious data can be contained in network traffic, such as electronic mail (email) communications, or other network communications. Receipt of malicious communications by way of a network can endanger both the receiving device and any other devices connected to the network. Thus, even well protected devices that are difficult to access via a public network can be impacted when a different device within the same network is impacted. For example, an e-mail containing a virus could be downloaded by an authorized user (e.g., using a workstation on the network) via a public network, and unintentionally passed to a sensitive device (e.g., a server) within a private network to which the user has access.

Many attempts have been made to secure networks and network computing devices. For example, various anti-virus programs and other protective programs and devices have been designed to limit the types of communications and the content of communications received by a network or any device on a network in an attempt to thereby limit malicious communications from being received by a device on the network. Often, such programs and devices rely on lists of known viruses or malicious content, which are frequently updated, and used as the basis of preventing communications of malicious or otherwise undesirable data within a network. Because of the ever-evolving nature of computer viruses and other malicious communications, however, it is difficult to sufficiently maintain such blocking programs or devices (even if updated) to prevent all viruses, malicious payloads, and otherwise undesirable data from reaching devices within a network intended to be protected by those programs.

Some networks make use of decoy systems or so-called "honeypot" devices, which appear to malicious, unauthorized users, to be easy or desirable targets within a given network. Decoys or honeypots can be used to attract malicious communications, which can be analyzed after being attracted and received. Upon analysis of payloads attracted to decoy or honeypot systems, network or device configurations can be altered to prevent attacks of the type analyzed from being successful with any network devices in the future.

One problem with decoy devices or honeypot devices is that they are often easily detected. For example, some decoy devices can attract communications from outside of a network but are incapable of properly responding to the attracted communication (e.g., responding to a query within an intercepted or attracted communication). Thus, the entity sending the communication attracted by the decoy device may become aware that the communication has been apprehended because the communication has not been properly responded to.

Additionally, other techniques for safeguarding network devices and communications received by those devices may block various ports of the network that present possibly vulnerable entry points. Thus, for example, ports that could potentially be exploited by a malicious user or communication can be prevented from receiving communications at all. However, some types of attacks can detect such blocks or otherwise determine that certain ports are being blocked. Using this information, traits about a network, such as the network's available services, the network's topology, or other traits can be detected and potentially exploited. Additionally, by blocking all communications on certain ports, even permissible communications are prevented from being received or transmitted via those ports, which could be problematic.

Once any of the prior systems intended to protect a network has been defeated, the network is vulnerable, and a malicious entity, such as a hacker or a virus, may be capable of exploiting knowledge unwittingly given. In certain instances, such information can unintentionally be provided by the very system or technique intended to protect a network from receiving malicious communications or otherwise being attacked or compromised.

Accordingly, it would be desirable to develop a system or method capable of adequately protecting a network, such as a system or method that is capable of dynamically adapting to new threats. Additionally, it would be desirable to avoid giving any knowledge of the network, devices on the network, or the structure of the network itself to external entities, such as unauthorized users, hackers, or the like to limit the potential attacks on the network.

SUMMARY

Accordingly, one or more embodiments of the invention provide a device, system, and method for defending a computer network. The device, system, and method of the invention are capable of dynamically adapting to new threats in real-time (e.g., preventing so-called "zero-day attacks"), or on an as-needed or on a "just-in-time" (JIT) basis. Additionally, the device, system, and method of the invention mask characteristics or traits of the network, devices on the network, or the structure of the network itself from external entities, thereby limiting potential attacks on the network.

For example, an embodiment of the invention provide a processor-readable medium comprising code representing instructions to cause a processor to analyze a received network communication; determine, based on information above the data link layer of the received network communication, if the received network communication is to be handled by a service available on a network; and respond affirmatively to a device sending the network communication that the service is available on the network. If it is determined that the service is available on the network, the code is configured to cause a processor to route received network communication to a component within the network that is configured to provide the service. If it is determined that the service is not available on the network, the code is configured to cause a processor to route the received network communication to a predetermined network component configured to analyze and interact with the received network communication and to generate rules based on analysis and interaction with the received network communication.

Additionally, another embodiment of the invention includes a processor-readable medium comprising code representing instructions to cause a processor to analyze a received network communication and determine if the received network communication includes an anomaly according to a predetermined rule set. If it is determined that the received network communication does not include an anomaly according to the predetermined rule set, the code is configured to cause a processor to handle the received network communication normally. If it is determined that the received network communication includes an anomaly according to the predetermined rule set, the code is configured to cause a processor to handle the received network communication according to a predetermined special handling procedure and update the predetermined rule set based on the anomaly.

Additionally, yet another embodiment of the invention includes an apparatus, comprising a receiver, a transmitter, an analyzer, and a router. The receiver is configured to receive information communicated from a first network to a component within a second network. The transmitter is configured to transmit information communicated from a component within the second network to the first network. The analyzer is configured to analyze the received information, and is configured to dynamically determine, based on information above the data link layer of the received information, if the received information is to be handled by a service that exists within the second network. The router is configured to route the received information to a component associated with a service within the second network responsive to a determination of the analyzer that the received information is to be handled by a service that exists within the second network. The router is also configured to route the received information to a predetermined component responsive to a determination by the analyzer that the received information is to be handled by a service that does not exist within the network.

Another embodiment of the invention includes a processor-readable medium comprising code representing instructions to cause a processor to receive network communications from a traffic filter including normal communications and anomalous communications, the normal communications being associated with services that exist within a network associated with the traffic filter, the anomalous communications having an anomaly. The code is configured to cause a processor to determine which network communications from the plurality of network communications are anomalous communications and generate rules associated with the network communications that are configured to filter anomalous communications from normal communications. The rules are at least partially based on the analysis of the plurality of network communications.

Another embodiment of the invention includes a processor-readable medium comprising code representing instructions to cause a processor to receive a network communication from an external network via a traffic filter, and determine if the network communication is to be handled by a service that does not exist within a network associated with the traffic filter. If it is determined that the network communication is to be handled by a service that does not exist within the network associated with the traffic filter, generate a response to the network communication such that information about the network associated with the traffic filter is not discernable from the response.

Further features of the invention, and the advantages offered thereby, are explained in greater detail hereinafter with reference to specific embodiments described below and illustrated in the accompanying drawings, wherein like elements are indicated by like reference designators.

DETAILED DESCRIPTION

Figure 1:
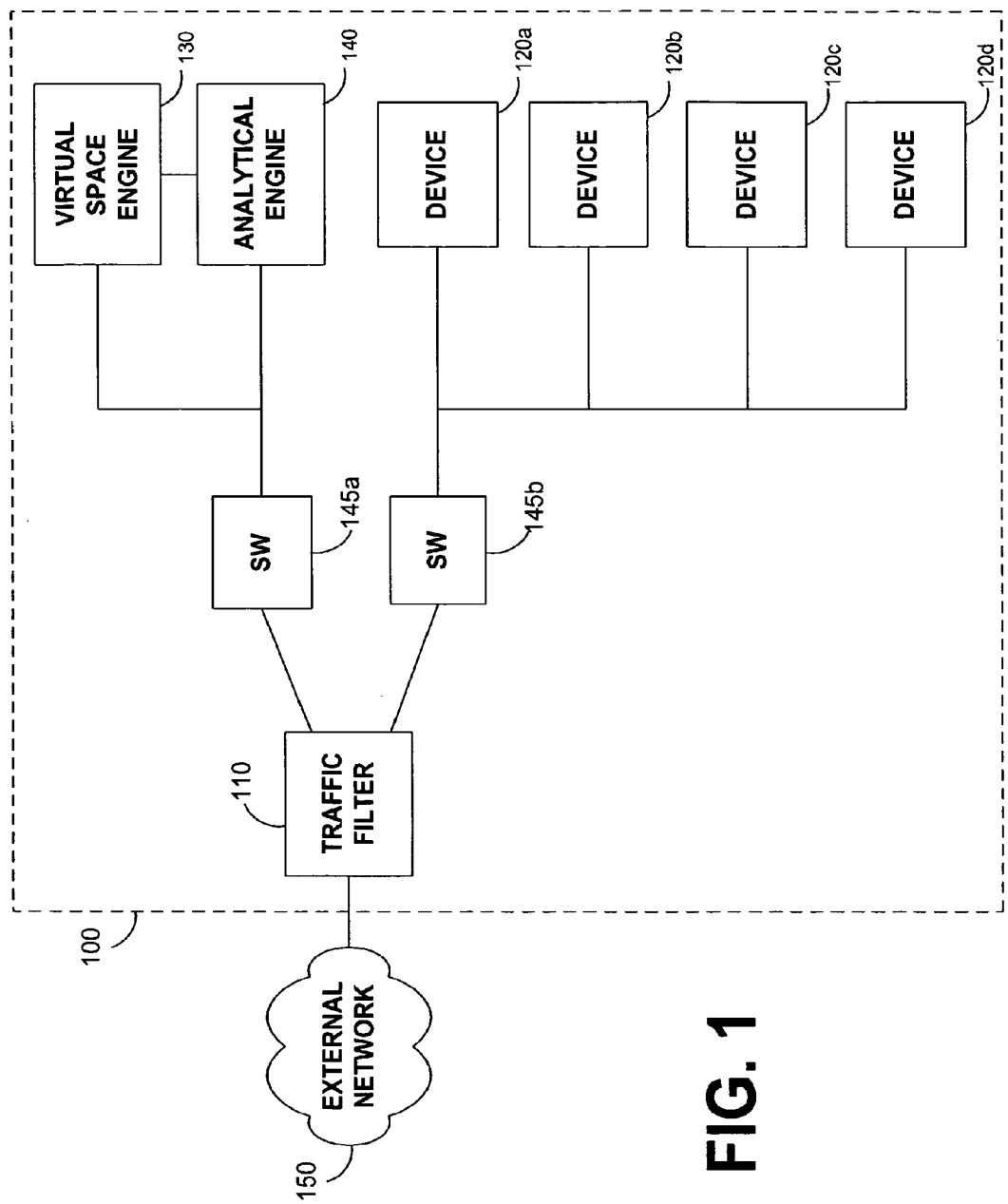
FIG. 1 is a block diagram of a network system, according to an embodiment of the invention.

According to one or more embodiments of the invention, a device, system, and method for defending a computer network are provided. The device, system, and method of various embodiments of the invention are configured to protect a computer network and devices located within that computer network. For example, one or more embodiments of the invention are capable of dynamically adapting and responding in real-time to new and previously unknown threats (sometimes referred to as "zero day attacks"). Additionally, one or more embodiments of the invention includes a device that is capable of responding in real-time to attacks that the device has not been previously configured to defend against (sometimes referred to as "false-negatives").

The dynamic adaptability of various embodiments of the invention can be accomplished by a mechanism referred to as a traffic filter, which can be configured to handle incoming communications (i.e., communications received from sources external to the network of the traffic filter) and/or outgoing communications (i.e., communications that are being communicated from the network of the traffic filter to devices outside of that network). The traffic filter can be, for example, used as a perimeter device to control all communications crossing a network boundary, or can be used as an internal network device configured to handle communications generally within a network (e.g., the traffic filter can act as a network switch) For example, the traffic filter can route normal network communications (i.e., non-anomalous communications) to a device within the network to which they are addressed, or by which they should normally be handled. The traffic filter can also be configured to detect any anomalies within received communications, and determine how to handle those anomalies (or the communications of which they are a part, which are sometimes referred to as "anomalous communications"). The term "anomalous communications" as used herein can refer to communications having attributes that are not common from the perspective of the traffic filter or the network of the traffic filter. Thus, for example, communications intended for a service that does not exist within the network of the traffic filter would be considered anomalous communications. Additionally, for example, communications using non-readable (e.g., non-ASCII) character sets in a DNS name response would be considered anomalous communications. Similarly, the term "anomaly," when used to refer to characteristics of anomalous communications can indicate the attributes of an anomalous communication that are not common and cause a communication to be characterized as anomalous.

Malicious communications can also often be considered anomalous communications by the traffic filter. For example, a communication can be considered anomalous if it includes a payload that is malicious. For example, if the traffic filter determines that a payload of a network communication contains malicious data (e.g., a virus, worm, etc.), then the anomalous network communication can be routed to the analytical engine by the traffic filter for determination of rules for handling such communications, or similar communications. Some communications that initially are deemed anomalous because they are not recognized by the traffic filter, however, may not be malicious and/or may ultimately be determined to be valid, permissible communications after initially being flagged, and then being analyzed according to one or more embodiments of the invention.

According to one or more embodiments of the invention, anomalies can be detected using "just-in-time" (JIT) discovery techniques, which are capable of detecting and/or determining previously unknown threats. When anomalous communications are received (i.e., communications containing some type of anomaly, or an unrecognized communication), the traffic filter can route such anomalous communications to special devices within the network or in communication with the traffic filter, which are configured to analyze the anomalous communications, and which can be configured to respond to the communications as if the component to which the communications were addressed, transmitted, or otherwise intended, were responding.

According to one or more embodiments of the invention, communications can be determined to be anomalous if they request a service that is not offered within the network. For example, if a file transfer protocol (FTP) request is made to a device within a network, and the network device does not offer FTP services, the traffic filter of that network can determine that the FTP request is an anomalous communication based upon the improper service request. Rather than routing such an anomalous communication to a device within the network, or simply apprehending the improper communication without responding, the traffic filter can provide the anomalous communication to a virtual space engine and/or an analytical engine for further operations.

The virtual space engine can be configured, for example, to respond to an anomalous communication, such as an improper service request, as if the virtual space engine offers the requested service, causing the requesting entity to treat the response as if that the requested service is offered by the network. Thus, the virtual space engine is able to prevent a requesting entity from determining that a service is not offered via the network.

The analytical engine can be configured, for example, to analyze a received communication, and determine if rules should be generated or updated to prevent any harm from the received communication. For example, when an anomalous communication is received, the analytical engine can be configured to generate rules that prevent additional, similar anomalous communications from being received by a network associated with the anomalous communication. Specifically, the analytical engine can receive anomalous communications from the traffic filter and/or the virtual space engine.

According to one or more embodiments of the invention, the analytical engine can determine rules configured to define handling of the anomalous communication based on attributes other than the anomaly within the communication. Thus, rules can be generated by the analytical engine regarding receipt of certain types of service requests, receipt of communications from certain network sources, receipt of communications having certain headers, or receipt of information containing similar but different anomalies.

Additionally, the analytical engine can be configured to perform "self testing" to determine the impact of rules on non-anomalous communications. For example, the analytical engine, can test rules on normal communications (i.e., non-anomalous communications) to determine the effect of the rules on the normal communications. If the effects are negligible, or within an excepted tolerance level, the rules can be implemented; however, if the effects of the rules on normal communications are outside of the acceptable range (e.g., normal communications are deemed anomalous, quarantined, or denied service too often), then the rules can be adjusted to bring the effects within the acceptable range. Therefore, this self testing can be used, for example, to avoid or reduce the number of "false positives" among normal communications.

Once the analytical engine generates rules, those rules can be communicated to and used by the traffic filter to determine whether future communications contain anomalies and should be handled by the virtual space engine and/or the analytical engine. Because the virtual space engine is configured to respond to any anomalous communication (e.g., communications requesting non-existent services within a network), information about the network, such as information about specific services offered by the network, the topology of the network, devices within the network, and so on, can be hidden from entities external to the network. For example, although many existing services are not offered by most networks, the virtual space engine in connection with the traffic filter, according to one or more embodiments of the invention, can provide a response to any type of service request, including requests for obscure services. Because of this capability, an entity communicating those requests to the network cannot determine which services are offered or are not offered by the network, or other information about the network that might provide potentially dangerous information about the network or its devices that could be exploited by malicious users.

Additionally, the traffic filter, according to one or more embodiments of the invention, can be configured to dynamically change communications from the network within which it is operating. For example, the traffic filter can be configured to dynamically change, substitute, or reorder transmission control protocol (TCP) packets and/or Internet protocol (IP) datagrams (sometimes also referred to as IP packets) in real-time. Additionally, according to one or more embodiments of the invention, the traffic filter can be used to dynamically change communications by changing information at the data layer and above, or to dynamically route incoming network communications based on information at the data layer and above.

The ability to dynamically change information in the TCP packet or layers within the TCP packet is supported by the traffic filter's ability to dynamically change lower-level protocols, such as IP, to allow the communication to continue without interruption. For example, because of the traffic filter's ability to dynamically change IP information avoids any need to modify sequence and acknowledgement information in the IP datagram. In addition to being able to modify IP, the traffic filter can dynamically change packets on multiple levels of the communication protocol stack.

Thus, for example, network communications provided by one device within a network can be dynamically changed to appear the same as network communications provided by another device within the network, even though the two devices and characteristics associated with communications transmitted from the devices are different. For example, the traffic filter can be configured to unify the structure of communication payloads, communication headers, and other information among devices in a network, which might normally structure such information differently from one another. This can be accomplished, for example, by changing data in-line or in real-time, which is sometimes referred to as "mangling."

Hence, the traffic filter can, according to one or more embodiments of the invention, mask traits of a network (such as the information about the topology of a network), by providing a credible response to requests for any type of service, or to communications using any network port. Additionally, because data can be changed during communications (i.e., in-line, or in real-time) by substitution, changing the length of data, changing header or payload information, or otherwise mangling the data (e.g., "IP mangling"), an application from which a communication cannot be determined, because its traits can be removed from the communications by the traffic filter during communications.

Moreover, various mathematical linear equations can be applied to network communications to provide protocol equivalency, which allows the traffic filter to determine what parts of a communication can be changed while maintaining equivalent information in the communication. According to one or more embodiments of the invention, for example, four characteristics that define how information can be transmitted without impacting the protocol's meaning can be used: deletion capability, insertion capability, substitution capability, and re-ordering capability. These four characteristics can for the basis of protocol equivalency rules. These protocol equivalency rules can be useful, for example, where an exact standard cannot be used for some reason, but an equivalent variation can be used.

For example, the HTTP protocol is specified with options having the first letter capitalized and the remaining lower case. So an option looks like "Pragma". However, some programmers have implemented the same options as "PRAGMA". This is an example of a substitution. Both Pragma and PRAGMA are equivalent in the protocol. According to one or more embodiments of the invention, protocol equivalency rules can be used to determine when it is possible to delete, insert, substitute and re-order information to create an equivalent communication message. Using these four characteristics, embodiments of the invention are able to define rules that allow protocols to be modified in appearance, but have the same meaning within the protocol.

FIG. 1 is a block diagram of a network system 100, according to an embodiment of the invention. The network system 100 shown in FIG. 1 includes multiple components configured to provide dynamic responses to communications received from devices external to the network system 100 (e.g., devices that access the network system 100 from within or via an external network 150). For example, the network system 100 includes a traffic filter 110, which is configured to receive communications from the external network 150, and route those communications within the network system 100. The traffic filter 110 can be configured to analyze incoming communications from an external network 150, and determine whether those communications are "normal" communications (i.e., communications that contain no known anomalies) that should be handled normally by the network system 100, or whether those communications include an anomaly or are unknown and should be considered "anomalous" communications to be handled by specific components of the network system 100 configured to handle anomalous communications. The traffic filter 110 can, for example, filter incoming communications according to a pre-determined set of rules. Additionally, or alternatively, the traffic filter 110 can filter incoming communications according to anomalies dynamically detected upon receipt of those communications (i.e., using JIT discovery techniques).

For example, the traffic filter 110 can route normal communications to one or more devices 120a, 120b, 120c, 120d (referred to together, individually, or as a subset as device(s) 120). For example, if the traffic filter 110 receives communications requests for web server functionalities via port 80, and one or more of the devices 120 within the network system 100 provides those web server functionalities, the traffic filter 110 can route the communications to the appropriate device 120 for providing those functionalities. If, on the other hand, the received communication is a communication that requests services or functionalities not provided by any of the devices 120 of the network system 100, then the traffic filter 110 can route those received anomalous communications to special components of the network system 100 configured to interact with an entity sending such anomalous communications, or to otherwise respond to those anomalous communications.

For example, according to one or more embodiments of the invention, anomalous communications that request services not offered by a device 120 within the network system 100 can be routed by the traffic filter 110 to a virtual space engine 130. The virtual space engine 130 can record received packets for analysis, and can communicate with an entity sending an anomalous communication, or otherwise respond to requests of the anomalous communication via the traffic filter 110. The virtual space engine 130 can also separate anomalous communications packets from normal communications packets within a single data stream, and route normal communications to the traffic filter 110 for handling by one or more devices 120 within the network system 100.

Because the virtual space engine 130 can interact with anomalous communications, which cannot otherwise be handled by the network system 100, additional information may be provided to the network system 100, which can be used to develop rules for handling communications or otherwise facilitate identification of anomalies within network communications. For example, if an attack is configured to deliver a malicious payload on a rarely used port, the virtual space engine 130, by responding using that port, can cause a malicious payload to be delivered, and the malicious payload can later be analyzed for development of filtering rules or other useful information in preventing such a malicious attack from being successful.

The traffic filter 110 and/or the virtual space engine 130 can communicate with an analytical engine 140, which is also part of the network system 100. For example, according to one or more embodiments of the invention, pre-determined rules used by the traffic filter 110 can be determined dynamically by the analytical engine 140. The analytical engine 140 can communicate these rules (also referred to as a rule set) to the traffic filter 110. Thus, the traffic filter 110 can implement even recent rules generated based on recently received communications (e.g., communications containing malicious payloads), and consequently the traffic filter 110 can prevent such malicious payloads from being delivered to one or more devices 120 within the network. Accordingly the dynamic determination of filtering rules by the analytical engine 140 exhibits some significant advantages over standard, slower-adapting, rules-based systems, as the analytical engine 140 is able to adapt based on the most recently received communications.

As anomalous communications are routed to the virtual space engine 130, those communications can also be communicated to the analytical engine 140. For example, the virtual space engine 130, after receiving an anomalous communication can provide the anomalous communication, or parts thereof (e.g., malicious payloads, etc.) to the analytical engine 140. The analytical engine 140, in turn, can divide the communications received from the virtual space engine 130 into one of several groups: total, checked, malicious, and/or good packets. Upon evaluating these packets, within the aforementioned categories, the analytical engine 140 can generate or modify one or more predetermined rules by which the traffic filter 110 will filter incoming network communications.

Additionally, the analytical engine 140 can perform "self testing" by comparing recently received communications with previously received communications to evaluate any filtering rules to be implemented by the traffic filter 110. The analytical engine 140 can also optionally receive a stream (e.g., an accumulation of all communication on the level of abstraction for a given communication sequence) of normal traffic from the traffic filter 110, which can be compared with anomalous communications to refine, filtering rules to be used by the traffic filter 110. This comparison can be advantageous, for example, as it can be used to verify filtering rules and their possible effects on normal communications before the rules are implemented.

For example, if a filtering rule is devised by the analytical engine 140 for a communication deemed to include an anomaly, the analytical engine 140 can determine whether the rule will affect or otherwise adversely impact the flow of normal traffic received by the traffic filter 110 by comparing the anomalous communication and/or the devised rule with the normal communications. If the rule would negatively impact normal traffic, the analytical engine 140 can further refine the rule or rule set to prevent any adverse impact on the flow of normal communications received by the traffic filter 110. If the traffic filter 110 deems a communication anomalous and the structure of that anomalous communication forms the basis of a filtering rule, for example, it may be desirable to ensure that filtering all communications having similar structure will not prevent receipt of normal communications. Thus, by comparing the rule with network communications determined by the traffic filter 110 to be normal, the analytical engine 140 can ensure rules that will prevent the future receipt of similar packet structures, while not affecting normal communications received by the traffic filter 110.

In the network system 100 shown in FIG. 1, the traffic filter 110 communicates with the devices 120, the virtual space engine 130 and the analytical engine 140 using one or more switches (SWs) 145a, 145b (sometimes referred to collectively, individually, or as a subset as switch(es) 145 or SW(s) 145). These switches 145 can be, for example, standard network switching devices or routers, configured to route communications from the traffic filter 110 to the intended device 120, the virtual space engine 130, and/or the analytical engine 140. It should be recognized, however, that the traffic filter 110 can be configured to communicate directly with any of the devices of the network system 100. For example, the traffic filter 110 can optionally incorporate the functionality of one or more switches 145.

Additionally, or alternatively, the traffic filter 110 and one or more of the other components of the network system 100 can be integrated into a single device. For example, according to one or more embodiments of the invention, the traffic filter 110, the virtual space engine 130, and/or the analytical engine 140 can be integrated in a single device instead of being distributed within the network system 100. For example, the combination of the traffic filter 110, the virtual space engine 130, and the analytical engine 140 can be configured as part of a single firewall device, or other network perimeter device, capable of communicating with an external network 150 or other devices external to the network system 100.

By using the traffic filter 110 and the virtual space engine 130 in combination with the analytical engine 140, the network system 100 shown in FIG. 1 can handle a variety of network communications, and thwart a number of different types of attacks from an external network 150. For example, as mentioned above, the virtual space engine 130 can allow the network system 100 to mimic protocols of requested services that are not supported by the network system 100. Thus, a device attempting to access an unsupported service within the network system 100 is unaware that that service is not supported within the network.

In addition to or alternatively to acting as a boundary sentinel, the traffic filter 110 can be used as an internal network switch. For example, the traffic filter 110 can receive and transmit communications from and to locations within the network system 100. As described above, in such an implementation, the traffic filter can still be used to filter anomalous communications from the normal communications, and route anomalous communications to the virtual space engine 130 and/or the analytical engine for handling.

The network system 100 generally, and the traffic filter 110 specifically can handle a variety of different protocols. For example, the network system can handle communications using state-oriented interactive protocols (e.g., file transfer protocol, or FTP), user datagram protocols (UDP) (e.g., a domain name system, or DNS protocol), generic responses (e.g., character streams), or other communications. Other protocols can also be handled by the network system 100, such as requests for comments (RFC) protocols, generic protocols, generic data stream protocols, and/or hypertext transfer protocol (HTTP) communications. Additionally, the traffic filter 110 can be used with various types of communication stacks or paradigms including, for example, wired connections (e.g., Ethernet, etc.) and wireless connections.

Additionally, the network system 100 can be configured to handle attacks using applications for a variety of operating systems, such as UNIX, Linux, Windows, the Macintosh operating system (OS), Palm OS, Windows CE, or other operating systems. The network system 100 can be configured to handle attacks on services that are frequently attacked, such as Web server services, for example. Additionally, specialized services such as a secure shell (SSH), FTP, mail protocols (e.g., simple mail transfer protocol or SMTP, Internet message access protocol or IMAP, post office protocol or POP3, etc.) can all be handled by the network system 100.

To better understand the real-time capabilities of the network system 100 shown in FIG. 1, and the ability of the traffic filter 110 to dynamically change network communications, or in other words to "mangle" communications packets, such as TCP packets or IP datagrams, a description of general network communication protocols and their layers is presented below in connection with FIG. 2.

Figure 2:
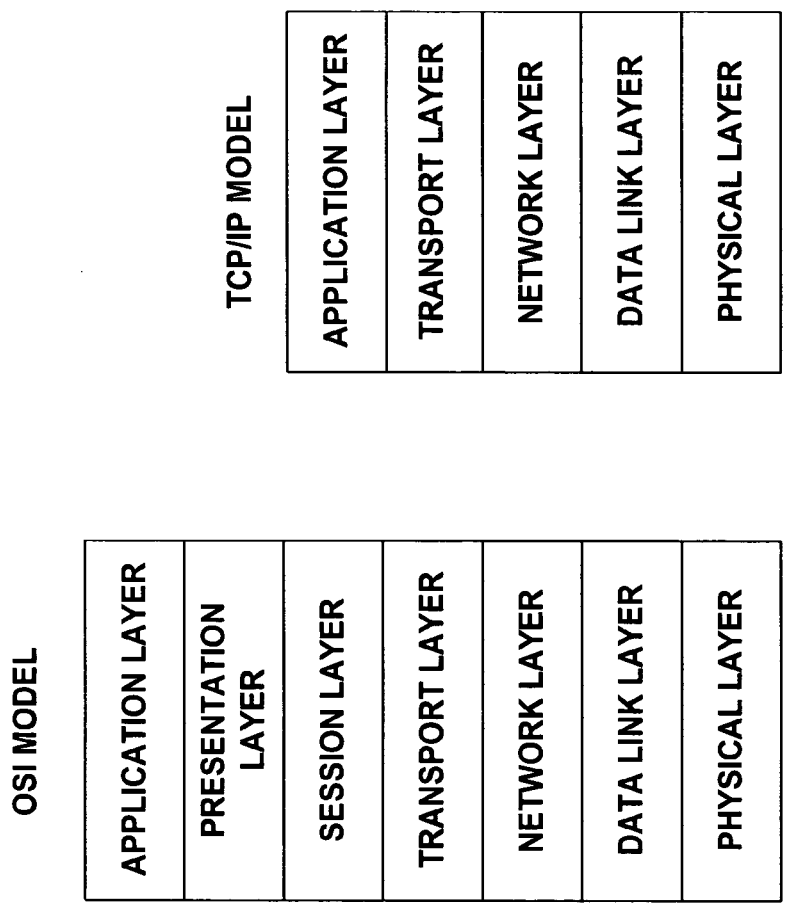
FIG. 2 is a block diagram of the open system interconnection (OSI) protocol model and the transmission control protocol/Internet protocol (TCP/IP) protocol model.

FIG. 2 is a block diagram of the open system interconnection (OSI) protocol model and the transmission control protocol/Internet protocol (TCP/IP) protocol model. Two communications protocol models are illustrated in detail in FIG. 2: the OSI protocol model on the left-hand side of the figure, and the TCP/IP protocol model on the right-hand side of the figure. Each of the protocols illustrated in FIG. 2 uses multiple layers, several of which are similar between protocols.

The OSI model includes seven layers. The application layer, frequently referred to as Application Layer 7, is the top layer of the OSI protocol stack. This layer represents the manner by which a transmitting application communicates. More specifically, the application layer symbolizes communications emanating from a particular application. For example, the application layer can refer to the type of communication from an application, such as an email communication, a file transfer, a client/server communication, or the like.

The presentation layer, sometimes referred to as Presentation Layer 6, is included in the OSI protocol stack only, and represents a layer where data conversion and/or data encryption/decryption are performed. For example, data conversion can include, for example, a conversion from the American Standard Code for Information Exchange (ASCII) data to extended binary coded decimal interchange code (EBCDIC) data, binary coded decimal (BCD) data to binary data, floating point data to binary data, or other similar conversions between data protocols.

The session layer, sometimes referred to as Session Layer 5, and is also only included in the OSI protocol, is a layer responsible for starting and stopping communications sessions, and maintaining order of the sessions. Although the TCP/IP protocol stack does not have a session layer, the transport layer of the TCP/IP protocol stack provides functionality similarity to the functionality provided by a session layer in the OSI protocol model.

The transport layer, sometimes referred to as Transport Layer 4, is a layer that ensures delivery of an entire file or message. This can vary, however, as the transport layer can include a protocol that establishes a virtual connection, and acknowledges received packets to ensure flow control of the data (e.g., TCP/IP), or a protocol that does not establish a connection or guarantee flow control or error detection of any data transmitted (e.g., UDP). Additionally, other protocols can be included within the transport layer, such as Internet control message protocol (ICMP), which is used (e.g., by routers, etc.) to send error and control messages, or other suitable protocols.

A network layer, sometimes referred to as Network Layer 3, is provided to route data to different networks and/or devices, based on network addresses (e.g., IP addresses, etc.). For example, the network layer can use an address resolution protocol (ARP) or similar technique to resolve or convert network addresses to device addresses, or vice versa.

A data link layer, sometimes referred to as Data Link Layer 2 or a media access control (MAC) layer, is configured to transmit packets based on a station address from node to node within a network. For example, the data link layer allows connection to one or more data link networks, or networks using a data link protocol (e.g., Ethernet, tokenring, fiber distributed data interface or FDDI, asynchronous transfer mode or ATM, synchronous optical network or SONET, frame relay network, exdot 25, wireless, etc.).

The OSI protocol model also includes a physical layer, sometimes referred to as Physical Layer 1, which represents the electric signals and cabling used to transmit a communication stream. Translation to and/or from the physical layer can be accomplished using a carrier sense multiple access/collision detection (CSMA/CD) technique, or other suitable access method.

The TCP/IP protocol stack shown on the right-hand side of FIG. 2 is similar to the OSI protocol model, with the exception that the presentation layer is removed and functionalities similar to those associated with the session layer of the OSI protocol model are provided using the transport layer of the TCP/IP protocol model.

The application layer of the TCP/IP protocol model can include a variety of applications, such as FTP, Telnet, HTTP, SNMP, DNS, Open Shortest Path First (OSPF), routing information protocol (RIP), PING, Traceroute, or other applications. Some applications within the application layer of the TCP/IP protocol model are part of the TCP/IP suite and, thus, the language and format of those applications are known to TCP/IP protocol suite. However, other applications, the format and language of which are not known to TCP/IP can also be used in the application layer of the TCP/IP protocol model. The transport layer of the TCP/IP protocol model generally uses two main types of transport protocols: TCP and UDP. The network layer of the TCP/IP protocol model generally uses IP.

When an application, such as an application in an external network 150 communicates using the TCP/IP protocol model, it begins in the application layer, and communicates by passing a stream of data bytes to the transport layer along with the socket of a destination device, which includes an Internet protocol (IP) address and port number. Typically, port numbers are reserved for specific applications, and so devices are generally only capable of servicing applications received on ports associated with applications running on those devices. The socket and data, or payload, information, is then handled by the transport layer.

As explained above, the transport layer can use a virtual connection, or can operate without establishing a connection. For example, using TCP, a virtual connection is established between the sending device and the receiving device, and both sides of the virtual connection negotiate packet sizes of TCP packets that can be communicated between the devices. Generally, TCP uses an adjustable buffer that allows a number of packets to be received before an acknowledgement is sent back. Thus, because the size of this buffer can be adjusted as conditions on the network change, TCP is capable of controlling flow of the data in real-time, and can perform error correction by retransmitting packets that have been received with errors, or that have not been received. TCP can also control communications, for example, by ensuring that the initial negotiated options are a common set of options based on previous activity or configured settings.

As an alternative to TCP, UDP does not establish a connection, and does not provide any flow control or error detection/correction capabilities. The transport layer (i.e. TCP or UDP) provides its packets to the network layer (e.g., IP). This information is passed to the network layer with an IP address of the destination network node. The network layer accepts the packets from the transport layer and prepares them for the data link protocol layer by converting IP addresses into physical device addresses (e.g., MAC addresses), for example, by using an address resolution protocol (ARP). The IP, or network layer, outputs packets referred to as "datagrams," each of which include an IP header, as well as a device address (e.g., a MAC address, such as an Ethernet address) of the target device or router. The network layer can also multitask a single message to multiple recipients by providing multiple device addresses.

As explained briefly above, the data link layer of the TCP/IP protocol wraps each IP datagram into its own frame format, including a header and source and destination address information, as well as a trailer including checksum data. This header, address information, payload, and trailer are sometimes referred to jointly as a "frame". Each frame is then transferred to the physical layer for electronic transmission via the network.

When network communications are received, the process described above is performed in reverse, removing each layer until the application layer is reached, and the application on the destination device can handle the incoming communication. Thus, when a network communication is sent, it begins by the source device processing the communication down through each layer of the communication protocol beginning at the application layer, and the receiving device performs the inverse process, processing the communication of the protocol stack until the application layer is reached. Each layer positioned higher than another layer can be referred to as being "above" or "higher than" the layer graphically represented below it in the diagrams shown in FIG. 2. For example, the application layer, the presentation layer, the session layer, the transport layer, and/or the network layer can each be referred to as "above" or "higher than" the data link layer or the physical layer. In the past, it has generally been difficult to manipulate data above the data link layer because of the impact to sequence and acknowledgement values associated with the flow of information contained in the payload of the TCP packet.

Figure 3:
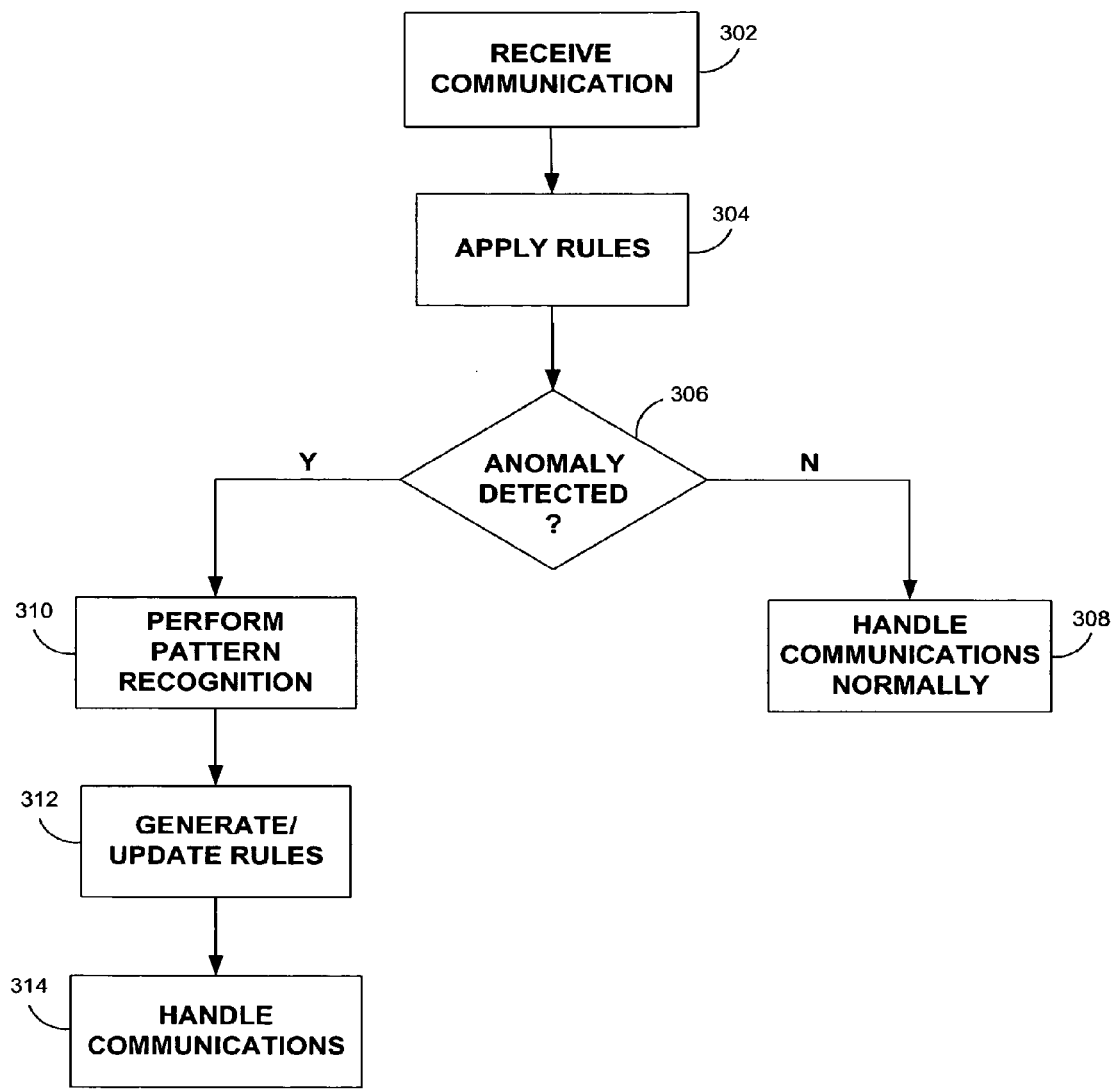
FIG. 3 is a flow diagram is a flow diagram illustrating operations associated with handling a received communication, according to an embodiment of the invention.

FIG. 3 is a flow diagram is a flow diagram illustrating operations associated with handling a received communication, according to an embodiment of the invention. The operations illustrated in FIG. 3 represent a generic set of operations for handling incoming traffic to the network system 100 shown in FIG. 1. Specifically, the communications are received in operation 302, and rules are applied by the traffic filter 110 in operation 304. As mentioned above, these rules can be generated by the analytical engine 140, for example, or can be predetermined or received from another source trusted by the network system 100, or an otherwise predetermined reliable source.

A determination is made in operation 306 by the traffic filter 110, regarding whether or not an anomaly is detected in the received communications (i.e., whether or not the received communication is considered anomalous). If no anomaly is detected, the received communications are handled normally in operation 308 by the traffic filter 110. This may include, for example, routing the communication to a device 120 to which it is addressed within the network system 100, or routing the communication to a device suitable for handling a communication of that type, or to provide a service requested by the communication.

If an anomaly is detected by the traffic filter 110 in operation 306, pattern recognition can be performed on the communication in operation 310 by the traffic filter 110 and/or the analytical engine 140. For example, if rules have been predetermined by the analytical engine 140, the traffic filter 110 can apply those rules to recognize a pattern within the received communications. On the other hand, if no rules exist relating to the received communication, it could be directed to the virtual space engine 130, and a copy can be provided to the analytical engine 140. The analytical engine 140 can then perform pattern recognition using some suitable logic. For example, according to one or more embodiments of the invention, the analytical engine 140 can use intelligent or expert systems, evolutionary algorithms, heuristics, or other suitable processing techniques to perform pattern recognition operations. In addition to performing pattern recognition for anomalous communications, anomalous communications can be analyzed in detail by the analytical engine. For example, the analytical engine may analyze the behavior and/or instructions of a worm to determine the best way to stop it and prevent future worms of a similar nature from penetrating the network system 100.

Once the analytical engine 140 has analyzed the received anomalous communication, and has performed a pattern recognition procedure on that received communication, the analytical engine 140 can then generate and/or update rules in operation 312, based on the pattern recognition performed. The new or updated rules can then be provided to the traffic filter 110, which can then use the new or updated rules to improved anomaly detection.

Once the anomaly has been thoroughly analyzed by the analytical engine 140, the communications received that include the anomaly can be handled in operation 314 by the virtual space engine 130, for example. The network system 100 can also optionally be configured to allow the virtual space engine 130 to handle received anomalous communications in parallel with analysis operations performed by the analytical engine 140 such that the entity sending the communication will not detect any processing delay on the part of the network system 100. The capability of handling anomalous communications without any perceived delay by a transmitting entity, therefore, allows the network system 100 to communicate to the transmitting entity (e.g., a malicious user) that the network system 100 can normally service the request associated with the received network communication. This is advantageous, as no traits of the network or any devices on the network are gained by the transmitting entity because the virtual space engine is able to fake communications as if any service requested of the network system 100 is available and running.

The anomaly detected by the traffic filter 110 in operation 306 of FIG. 3 can be one of a number of different types of anomalies. For example, as discussed above, the traffic filter can determine that the devices 120 of the network system 100 do not support a service requested by the received communication. In such a case, the requesting communication would be considered anomalous, or in other words would be considered to include an anomaly, and would, thus, be handled by the virtual space engine 130 and/or the analytical engine 140. Additionally, if a received communication violates a predefined rule (e.g., a rule defined previously by the analytical engine 140, etc.), the traffic filter 110 can consider the communication to be anomalous. Such anomalous communications can be handled by the virtual space engine 130 and/or the analytical engine 140. Moreover, if the received communication is simply unrecognized by the traffic filter 110, it can be considered anomalous, and can be routed to the virtual space engine 130 for handling and/or the analytical engine 140 for further analysis.

Other anomalies can also be detected by the traffic filter 110, such as internal inconsistencies with received communications. For example, if the checksum associated with one or more received packets does not match the packet or its payload, the traffic filter 110 can treat the received communication as anomalous, and route it to the virtual space engine 130 and/or the analytical engine 140. In addition to those anomalies discussed above, the traffic filter 110 can be figured to detect any number of anomalies in the received communication, and can perform pattern recognition on the received communications, as illustrated in operation 310, new rules can be generated, or existing rules can be updated in operation 312 by the analytical engine 140, and/or the communications can be handled in operation 314 by the virtual space engine 130.

Figure 4:
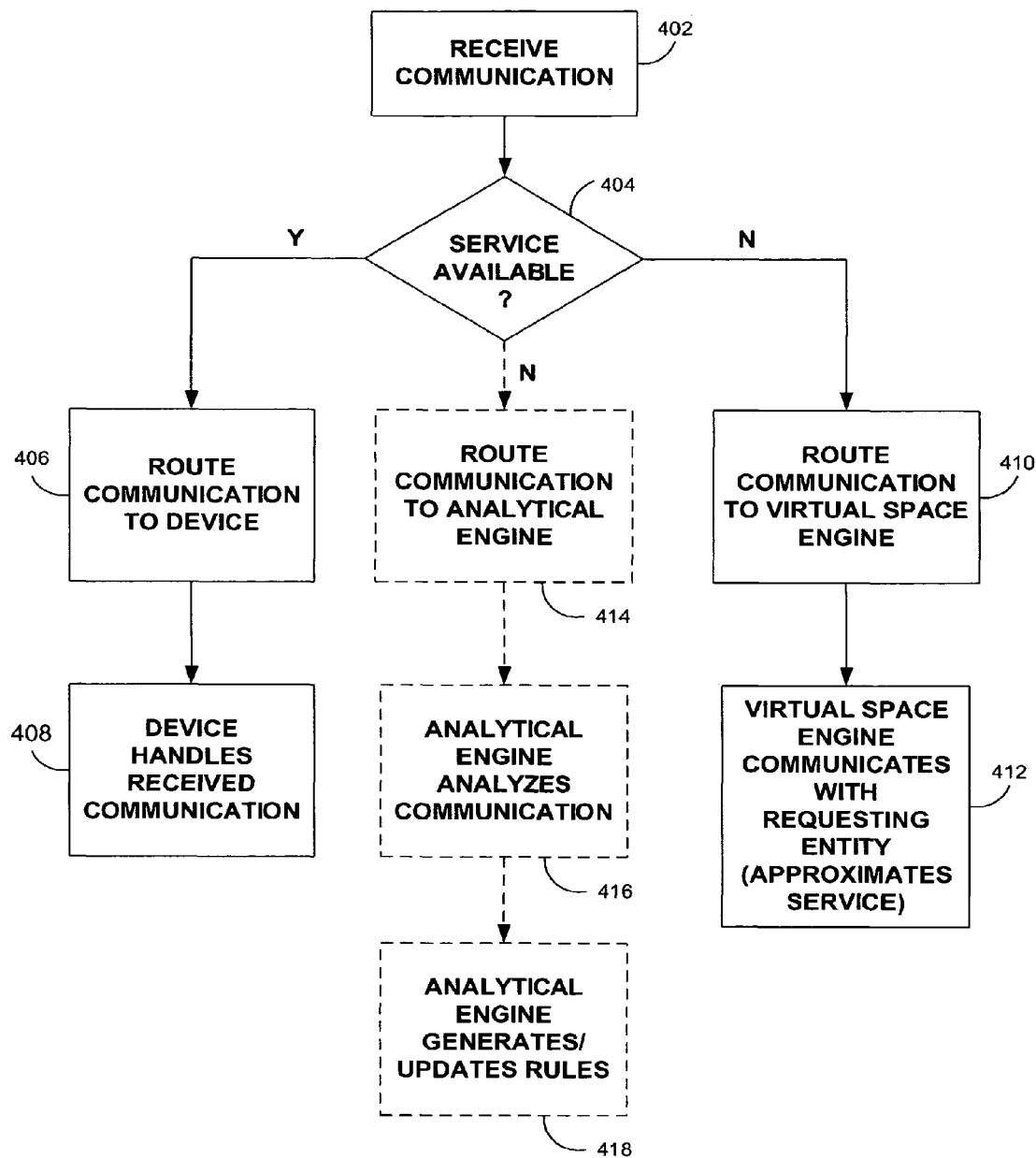
FIG. 4 is a flow diagram illustrating operations associated with handling a received communication, according to an embodiment of the invention.

FIG. 4 is a flow diagram illustrating operations associated with handling a received communication, according to an embodiment of the invention. The flow diagram illustrated in FIG. 4 is discussed below in connection with the network system 100 shown in FIG. 1. In FIG. 4, various operations are illustrated, which are performed by one or more components of the network system 100 shown in FIG. 1. For example, in a first operation 402, the traffic filter 110 receives a communication, such as a network communication from a device external to the network system 100 (e.g., via an external network 150), for example. As discussed above, one of the functions of the traffic filter 110 is to determine if the received communication is normal or anomalous. FIG. 4 illustrates one example of such a determination where, if a received communication is addressed to a service that is not supported within the network system 100, then the traffic filter 110 can treat the received communication as anomalous.

After the communication is received in operation 402, a determination is made in operation 404, regarding whether or not the service requested by the received communication is available. If it is determined that the service requested by the received communication is supported within the network system 100, then the traffic filter 110 treats that communication as a normal communication, and in operation 406 routes the communication to a device 120 of the network system 100 configured to process communications associated with the requested service. The device 120, in turn handles the received communication in operation 408 using whatever application is associated with or required for handling the requested service.

If it is determined in operation 404 that the requested service is not available, then the traffic filter 110 treats that communication as an anomalous communication, and routes the received communication to the virtual space engine 130 in operation 410. The virtual space engine 130, in turn, can communicate with the requesting entity (i.e., the entity from which the communication is received in operation 402), and can approximate the requested service in operation 412. Hence, as described above, the virtual space engine 130 can respond to a requesting entity, such as a malicious requestor, a hacker, or the like, by approximating the service requested by that entity.

Additionally, the traffic filter 110 and/or virtual space engine 130 can optionally route the communication to the analytical engine 140 in optional operation 414. The analytical engine 140, in turn, can analyze the received communication in optional operation 416. Based on the analysis performed in optional operation 416, the analytical engine 140 can generate or update rules in optional operation 418. These rules can be communicated to the traffic filter 110 for use by the traffic filter in filtering future traffic received from devices external to the network system 100 (e.g., via the external network 150).

According to one or more embodiments of the invention, the use of the analytical engine 140 to generate and/or update rules used by the traffic filter 110 is advantageous for several reasons. First, the rules generated or updated by the analytical engine 140 are dynamically generated or updated, such that the rules match the actual threats encountered by the network system 100 and the traffic filter 110.

Additionally, by continuously updated rules, according to one or more embodiments of the invention, the analytical engine 140 can combine two common types of protection (sometimes jointly referred to as "intrusion protection"), which are commonly known as: "anomaly detection" and "pattern matching". For example, systems can perform malicious detection by relying on continuously updated lists of patterns (e.g., virus lists, threat lists, etc.). Systems can also perform anomaly detection by relying on a list of abnormalities associated with malicious or unwanted communications, such as requesting non-existent services.

While the traffic filter 110 of the network system 100 shown in FIG. 1 is capable of performing a combination of anomaly and pattern detection, it can also benefit from dynamic interaction with the analytical engine 140, which is configured to generate patterns associated with unwanted communications received by the network system 100. These patterns describe the anomalous behavior without using the anomaly. In doing so, activity that generated the anomalous communication can be prevented even when the thresholds that generated the anomaly have yet to occur. Thus, the traffic filter 110, according to an embodiment of the invention is capable of filling in a gap between anomaly detection and pattern detection commonly used.

Some existing systems perform some types of pattern recognition; however, the analytical engine 140 benefits from the synergy of the anomaly detection performed by the traffic filter 110, and the pattern recognition it performs. For example, prior systems use pattern recognition alone to automatically recognize patterns received and filter out malicious communications. However, according to one or more embodiments of the invention, the gap between anomaly detection and pattern detection is closed by the one or more embodiments of the invention, which does not require allowing any anomalous communications (e.g., as a "threshold anomaly") prior to being able to detect anomalies. For example, if an anomaly detection system has a rule stating that a user cannot be logged-in remotely and logged in at the user's desktop at the same time, the system would only be aware of an anomaly at the time of the second login. Because the anomaly only occurs at the second login, the anomaly detection system cannot know which login (i.e., the first or the second) is unwanted or malicious, and cannot provide any remedy until a second login (i.e., the anomaly for this rule) occurs. When the anomaly is detected, significant damage may have been done already. One or more embodiments of the invention combine the advantages associated with both anomaly detection and pattern recognition to achieve synergistic advantages in anomaly detection and prevention.

Additionally, rather than simply filtering out unwanted malicious communication, the network system 100 shown in FIG. 1 can dynamically update a rule set by which the traffic filter 110 filters anomalous communications from normal communications. This filtering can be performed in such a way that allows communications that would otherwise be considered normal within the same data stream as anomalous communications to remain unaffected because the rules generated by the analytical engine 140 can take into account both anomalous communications and normal communications, according to one or more embodiments of the invention.

It should be recognized, however, that the analytical engine 140 and/or the traffic filter 110 can also generate other types of rules in addition to dynamic rules. For example, "trivial rules" can be generated for performing exact matching of malicious communications that do not change and, therefore, have no statistical deviation, but can be prevented by stopping the exact payload of the packet. More specifically, a "trivial rule" is a rule configured to handle an attack that always has the same payload (e.g., there are no variables in the attack), and is, therefore, considered trivial. Additionally, the traffic filter can use other rules, such as predetermined rules (e.g., virus lists), or other preexisting rules. Accordingly, the network system 100 can benefit from both static and dynamic rules. It should be noted that application of any of these rules can be subject to, or modified according to, a need to avoid undesirable impacts on normal communications.

Figure 5:
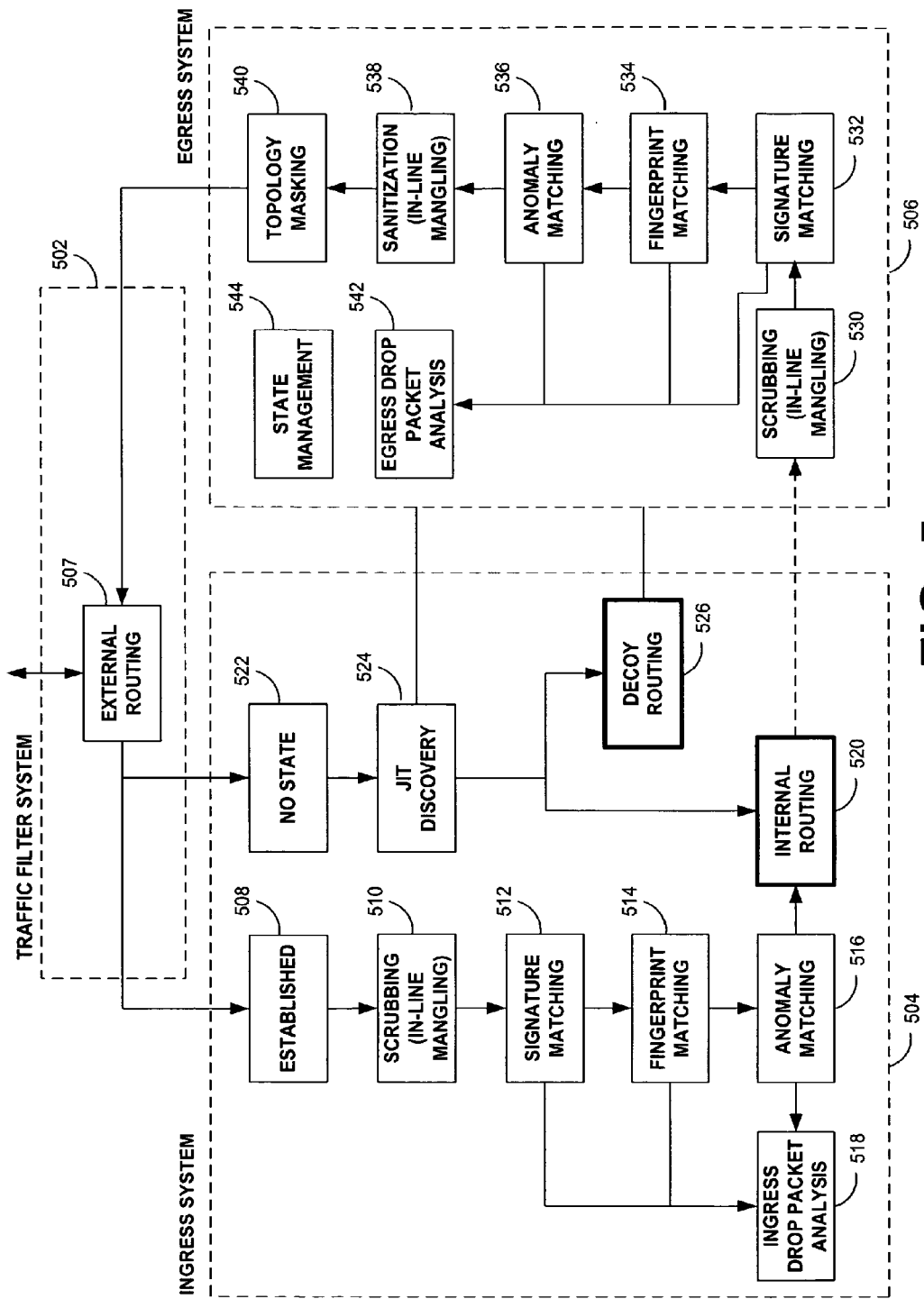
FIG. 5 is a flow diagram is a flow diagram illustrating operations associated with handling incoming communications and operations associated with handling outgoing communications, according to an embodiment of the invention.

FIG. 5 is a flow diagram is a flow diagram illustrating operations associated with handling incoming communications and operations associated with handling outgoing communications, according to an embodiment of the invention. In FIG. 5, a traffic filter system 502 is shown in communication with an ingress system 504, which handles filtering of incoming communications, and an egress system 506, which handles filtering of outgoing communications. The traffic filter system 502 can also communicate with other devices or network components within its network by any suitable means (e.g., via standard wired or wireless communications protocols). The blocks shown in FIG. 5 represent either functions performed by one of the systems shown in that figure, or a state of communications within those systems. Any of the systems shown in FIG. 5 can form part of the traffic filter 110 shown in FIG. 1, for example, which is capable of handling the ingress and egress of communications in the manner shown in FIG. 5. It should be recognized, however, that the flow diagram shown in FIG. 5 is only one example of how communications can be handled by the traffic filter.

The traffic filter system 502 can perform external routing 507, and thus can act as a peripheral component of a network (e.g., managing communications across a network boundary). The traffic filter system 502 can also perform external routing 507 as an internal network switch, without consideration for any network boundary, depending upon the desired implementation.

When incoming communications are received by traffic filter system 502, the external routing 507 capability causes those communications to be routed to the ingress system 504. Either the external routing 507 capability or functionality of the ingress system 504 can determine whether the incoming communications have an associated established state 508 or no state 522 (i.e., the communication is deemed anomalous or potentially anomalous). If an incoming communication is recognized (e.g., has an established state 508), the incoming communication can be scrubbed 510, or in other words, in-line mangling (e.g., IP mangling) can be executed on the incoming communication. A communication can be, for example, scrubbed to determine conformity of packets.

Additionally, the ingress system 504 can perform additional functions on the incoming communication, such as signature matching 512 (e.g., checking to see if a signature is accurate and/or if a signature associated with a communication or communication payload matches the communication or payload itself) and fingerprint matching 514 (discussed in greater detail below in connection with FIG. 13). Additionally, anomaly matching 516 can be performed, and is used to determine what communications payloads are examined for categorization of signatures. Anomaly matching 514 can be used to stop specific malicious behaviors, and when the packets flagged as anomalous are passed to an analyzer (e.g., the analytical engine 140 of FIG. 1), the type or class of attack represented by an anomalous communication can be prevented.

If any of the matching analyses 512, 514, 516 fail, an analysis 518 is performed to determine if at least a portion of the incoming communication (e.g., a packet, a datagram, etc.) should be dropped. If the matching analyses 512, 514, 516 do not fail, then the incoming communication can be routed internally, 520. Internally routed communications can be optionally routed to the egress system (either directly or indirectly via other internal operations), to be handled for transmission to other components of a network via the traffic filter system 502. Additionally, the internal routing 520 can simply route an incoming communication to internal components for handling internally.

Incoming communications that have no state 522 associated with them are routed to a JIT discovery 524 function that can determine whether a detected anomaly is serious and warrants decoy routing 526, or whether the communication can be routed internally 520. The JIT discovery 524 can route a communication to decoy routing 526 automatically, for example, if a service is requested and the service does not respond. In this manner, communications that are received by the traffic filter system 502 will receive a response, regardless of whether a service to the requested address and port exists within the network associated with the traffic filter system 502. The ability to do this in real-time provides both address and service masking attributes of the network associated with the traffic filter system 502.

The ingress system 504 can also categorizes data in a number of ways. For example, data can be categorized using exact payload matching, statistical pattern matching, simple pattern matching, exact fingerprint matching (e.g., matching combinations of patterns), partial fingerprint matching (e.g., matching partial patterns), and anomaly matching. Exact payload matching is described in greater detail below in connection with FIG. 12, and exact and partial fingerprint matching are described in greater detail below with reference to FIG. 13.

To prevent an attacker evading categorization, the ingress system 504 can reassemble and scrub the incoming communications. Thus, network-level attacks can be mitigated, and a packet can be interpreted or categorized by a destination device by modifying the packet to a state that the ingress system 504 can predict or interpret. Additionally, the ingress system 504, as well as the egress system 506 can control the timing of the communications. For example, the JIT discovery 524 capabilities allow the ingress system 504 and/or the egress system 506 to respond quickly to service requests while it determines if the service is active (e.g., prior to knowing if the service is active or exists on the network). The ingress system 504 and/or the egress system 506 are also capable of "tarpitting" communications if desired, and can slow or stop a communication to allow other defensive elements or functions to process information.

The JIT discovery 524 functionality of the ingress system 504 routes incoming communications based on the response of a service requested by the incoming communications. The route is determined when a service responds or by the lack of a response to a request. If the process of discovering the status of a service takes a significant amount of time, the client may "time out." To prevent this time out, JIT discovery 524 responds to the connection request by performing a response prior to the actual response of the destination system (e.g., using a predicted likely response for the received request). An example of this automatic, early response, is discussed below in connection with FIG. 9. In support of this automatic response capability, the JIT discovery 524 functionality maintains the offsets to the header information necessary to change the packet's values without having to create two IP stack (as would be necessary when using a proxy). This can be accomplished, for example, as described below in connection with content mangling of varying lengths for masking a network topology.

The Egress system 506 can handle communications to be sent out by the traffic filter system 502. For example, a communication intended to be transmitted by the traffic filter system 502 can be scrubbed by the scrubbing 530 (e.g., in-line mangling) functionality of the egress system 506. The scrubbed communication can then undergo one or more matching operations, which can include, for example, signature matching 532, fingerprint matching 534, and/or anomaly matching 536. If these operations are carried out successfully on the communication, it is then sanitized 538 (e.g., using in-line mangling) prior to being transmitted by the traffic filter system 502. Sanitization techniques are discussed in greater detail below in connection FIG. 6 and application masking. Additionally, topology masking, which removes topological traits of the network associated with the traffic filter system 502 (e.g., removing characteristics placed in communication packets or headers by devices on the network), can also be performed on the communication prior to transmission of the communication by the traffic filter system 502. Topology masking is described in greater detail below with reference to FIG. 6.

If it is determined by one of the analyses 534, 536, 538 of the egress system 506 that there is a problem or potential anomaly with the communication, an egress drop packet analysis 542 can be performed on the communication. Additionally, state management 544 functions can also be performed by the egress system 506, which can, for example, filter communications prior to transmission to the external routing 507 function of the traffic filter system 502.

Figure 6:
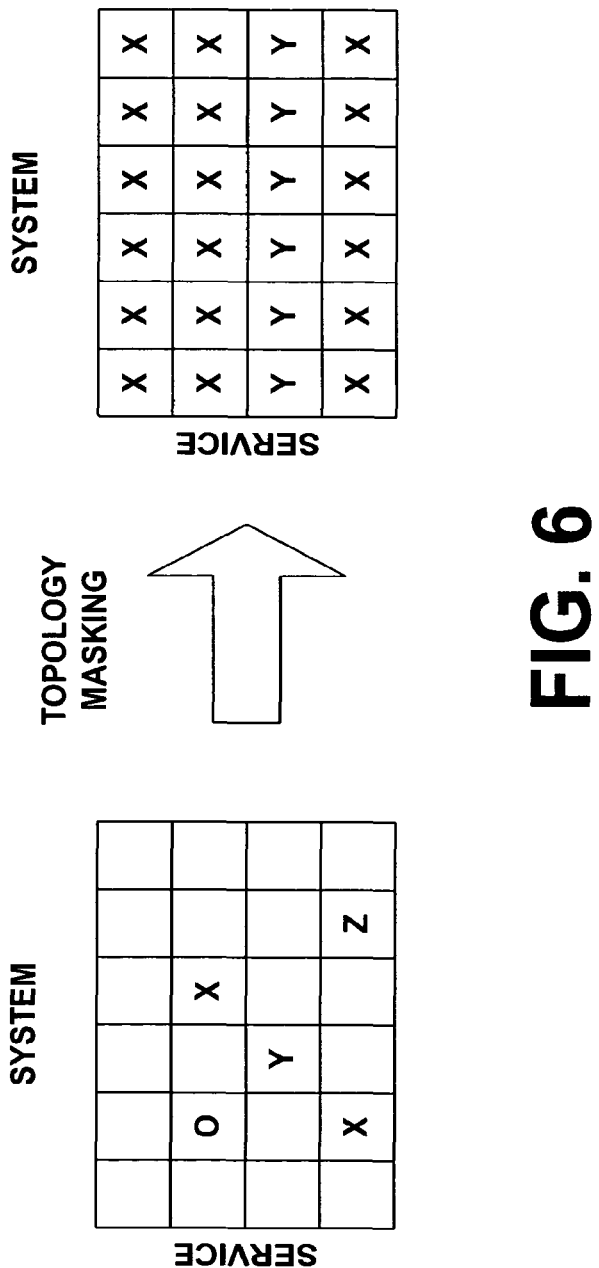
FIG. 6 is a diagram showing the transformation from real network attributes to apparent network attributes, according to an embodiment of the invention.

FIG. 6 is a diagram showing the transformation from real network attributes to apparent network attributes, according to an embodiment of the invention. As discussed above, various services can be offered within a network system, such as the network system 100 illustrated in FIG. 1. On the left-hand side of FIG. 6, a standard network system topology is illustrated (e.g., the topology of the network system 100). This topology is illustrated in the form of a grid, where the horizontal entries represent different components of a system (e.g., different devices on a network system), and the vertical entries represent different services available on those system components.

Each of the services is illustrated as responding differently, which is represented by different letters, depending upon the device upon which the service is requested, and depending upon the service that is requested. Thus, the same service requested on two different devices may produce responses having different attributes (e.g., as represented by an "O" and a "X") for the same service. Additionally, using the topology on the left-hand side of FIG. 6, it can be readily determined (e.g., by way of a third-party scan of the system) that various components of the system do not offer certain services. This information could potentially be exploited by a malicious entity.

One example of a technique that exploits information available from the topology on the left-hand side of FIG. 6 is called scanning. Scanning makes use of the fact that, in a typical network system, many of the possible services (e.g., as represented by IP port numbers) are not used. It should be recognized that the number of ports, and thus the number of services possible for a given network is large, as there are 65,535 port addresses available within a network. Therefore, it should be understood that the system-services grid illustrated in FIG. 6 is a simplified representation. Although over 65,000 port addresses are available, frequently only two or three of those services are available within a given network system. Examples of some services that are frequently used include: name services (port 53), web services (port 80), mail services (port 25), and FTP services (port 21). If, for example, these four examples of services are the only services supported by a network system, 65.531 port addresses would go unused, leaving a large number of unused address-to-port mappings, which remain unassigned in a given typical network system.

Because of the large number of unassigned address-to-port mappings, a scanning attack can focus on address-to-port mappings that are associated with possible vulnerabilities. For example, each component on a network, or each device with an IP address, for example, can be scanned for address-to-port mappings that are associated with a possible vulnerability. This can be accomplished using automated scripts, worms, or other computer programs, or alternatively can be done manually. Because most mappings do not have an active service, there are few replies to such a scan, and the entity performing the scan can determine what services are not available on the network, giving a picture of the structure of the network.

Scanning is one of the most prevalent types of attack and, therefore, merits serious concern. For example, it is estimated that approximately 80% of all internet-based attacks are related to worm-based scanning techniques. Additionally, approximately only 3% of attacks are not directly related to scanning techniques, when worm-based scanning is taken into consideration. Scanning is capable of detecting potential vulnerabilities in a network, as components that do not support certain services can be detected, or as certain easy-to-exploit services can be detected as available for one or more components within the network system, an entity using scanning can quickly determine potential vulnerabilities within the network system and attempt to exploit those potential vulnerabilities.

Accordingly, one or more embodiments of the invention uses topology masking, which transforms the easily scanned topology on the left-hand side of FIG. 6 to the more difficult to scan topology shown on the right-hand side of that figure. Specifically, on the right-hand side of FIG. 6, each service generally responds in the same manner on each component within the network system, even though some services might be permitted to respond differently from other services. Additionally, as shown on the right-hand side of FIG. 6, each service responds for each component. Thus, whenever a service is queried by an outside entity, such as a malicious user or program, it is very difficult for that outside entity to determine which services are actually available on the network, since it appears that each service is available, and each service is responding similarly to the way that service responds on another device.

Because an entity using scanning techniques for malicious purposes will likely visit a vacant address-to-port mapping before visiting an active port, it is easy to identify such a malicious entity when one of the fake services (e.g., supported by the virtual space engine 130 of the network system 100 as shown in FIG. 1) is accessed. When a fake service (e.g., a service provided by the virtual space engine 130) is accessed by a malicious entity, and that entity transmits communications (e.g., containing a malicious payload) that attempt to exploit the fake service. When this communication is received by the network system, the analytical engine 140 can obtain a copy of the malicious communications (i.e., malicious payload or packets), and those malicious communications can be used to generate and/or update a filtering rule that can be used by the traffic filter 110 to improve the filtering capability of the network system 100 generally, and to prevent similar attacks in the future. As mentioned above, any newly generated or updated rule can be tested against previously received normal communications to determine whether there will be any adverse impact to normal operations within the network system 100. If an adverse impact is experienced, the rules can be updated to correct any negative impact.

Finally, and perhaps most significantly, because all services within the network system 100 respond as active (as shown on the right-hand side of FIG. 6), the network topology is unknown to a scanning entity. Thus, without knowledge of any vulnerable systems, a malicious entity, such as a hacker or worm can be slowed, and gains nothing from a scan of the overall network system 100. For example, if a malicious worm is introduced into the network system 100, and the response to each service request indicates that the requested service is active, the worm can be slowed, and cannot use hit lists, which would otherwise indicate potential points of attack (e.g., vulnerable systems, devices, etc.) within a network system. Additionally, or alternatively, the worm will have to use its malicious payload blindly, thereby allowing the malicious payload to be captured (e.g., by the virtual space engine) and used (e.g., by the analytical engine 140) to create a defensive filter, such as a predetermined set of rules configured to allow the traffic filter 110 to better filter malicious communications.

Topology masking can be accomplished, for example, using content mangling, such as packet mangling. For example, content a firewall, router, or other suitable device can accomplish mangling of varying lengths, whereby the content or payload of a packet can be changed during transit without using a proxy. This is particularly difficult and sometimes useful when the lengths of the original value and the swapped value differ. For example, when the lengths are the same, a simple substitution of a payload and change of the checksum associated with the payload is required. When substitutions of different lengths are made, however, offsets to acknowledgement and sequence numbers can be maintained. By maintaining differential offsets for sequence and acknowledgement packets, as well as by recalculating the checksum after a substitution, the contents of a payload can be changed while communications associated with the transport layer of the payload can be maintained.

In addition to topology masking (illustrated in FIG. 6), application masking can also be used to prevent any application traits, network traits, or device traits from being undesirably transmitted to an entity external to a network, such as the network system 100. For example, all attributes of devices on a system can be represented as some subset of fake and actual attributes, as described below in connection with FIG. 7.

For example, sanitization techniques can be used to mask traits of an application and/or traits of a network. Sanitization is a specific use of content mangling, which can change an application protocol during transmission. In particular, the application layer protocol can be changed though insertion, deletion and/or modification. By way of such changes, unique characteristics can be removed (e.g., to hide application traits) or inserted (e.g., to provide a target application, to create apparent attributes of an application other than the application sending a communication), at the application layer as to make determination of an application difficult. As with other types of mangling described herein, sanitization can be performed in-line. Additionally, sanitization techniques according to one or more embodiments of the invention can change an expression to a null expression (i.e., the expression can be deleted from a communication).

Figure 7:
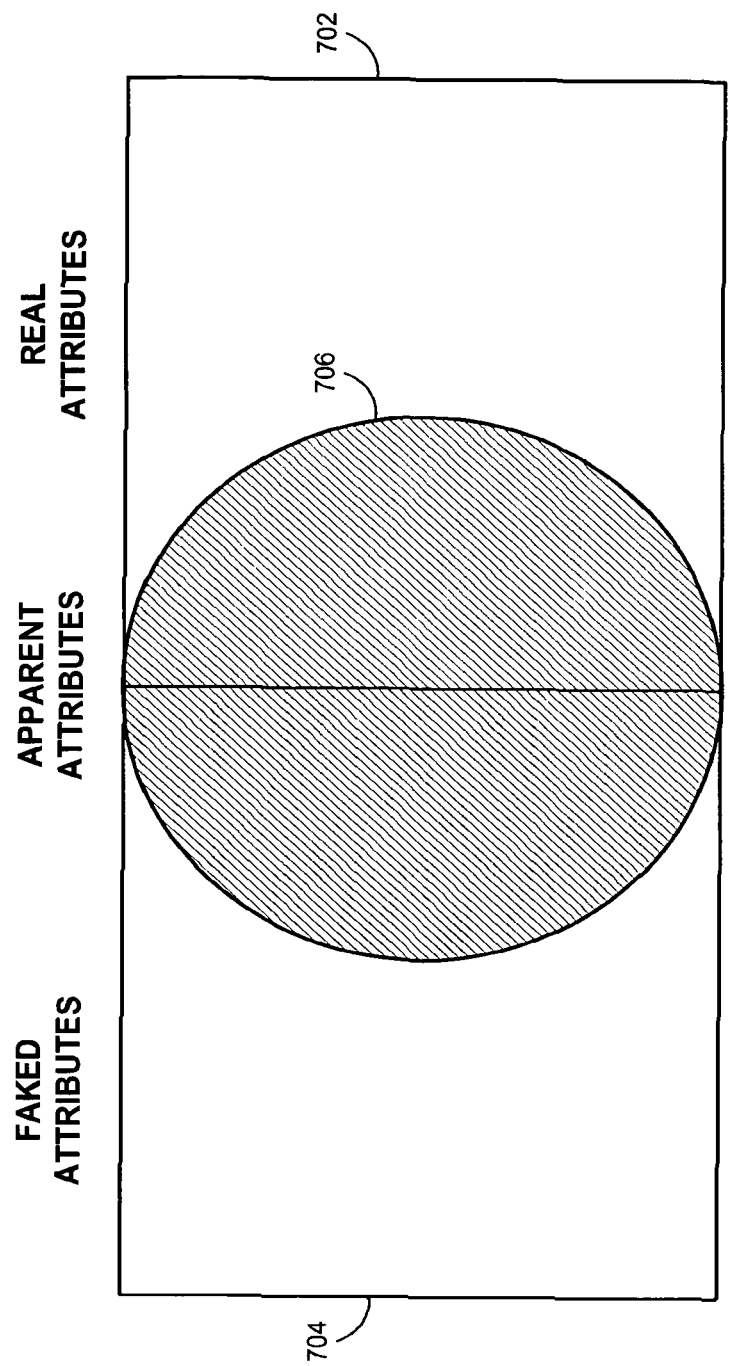
FIG. 7 is a block diagram showing network attributes, according to an embodiment of the invention.

FIG. 7 is a block diagram showing network attributes, according to an embodiment of the invention. In FIG. 7, two rectangles are used to illustrate different attributes associated with devices on a network and/or communications handled by the network. For example, actual or real attributes are illustrated by the right-most rectangle 702. These real attributes 702 represent the set of all actual attributes within the network system 100. Some of the real attributes that exist within the network system 100 may be traits that are undesirable to be communicated to external entities, because they could potentially reveal possible weaknesses, or specific information about one or more devices within the network system 100.

A number of faked attributes are represented by the left-most rectangle 704 shown in FIG. 7, and can be created, for example, by the virtual space engine 130 of the network system 100. As with the real attributes 702, it may not be desirable to reveal all possible fake attributes. Instead, it may be desirable to prevent communication of certain types of attributes (real or fake) to any entity external to the network system 100 (e.g., entities accessing the network system 100 via the external network 150).

According to one or more embodiments of the invention, a subset of real and fake attributes is created, and forms apparent attributes, represented by the circle 706 shown in the center of FIG. 7. This subset of apparent attributes is portrayed in every communication from devices within the network system 100 to devices external to the network system 100, such that every communication from the network system 100 appears to come from a device having the desired apparent attributes. Thus, whether a service is fake (e.g., provided by the virtual space engine 130), or if a service is real (e.g., provided by one or more devices 120 within the network system 100), an external entity will only see the predetermined apparent attributes 706, which can be tailored to eliminate any harmful real or fake attributes that would reveal information about the network system or its components.

Moreover, the apparent attributes 706 shown in FIG. 7 can optionally be tailored so that they appear to provide an attractive target for an attack, when they in fact do not. Using such a technique, a decoy or honeypot within the network system 100 can be used to attract malicious communications from outside the network system 100, so that the malicious communication can be analyzed (e.g., by the analytical engine 140), and based on that analysis, the network system 100 can better defend itself against such malicious communications or attacks.

The attribute masking shown in FIG. 7 can be used in combination with the network topology masking illustrated in FIG. 6, such that an entity external to the network system is unable to determine any information that is useful and normally obtained by traditional scanning techniques. Generally, for example, as scan techniques become more efficient, they become more susceptible to protection techniques of one or more embodiments of the invention. For example, the various components of the network system 100 can present any requested service in a manner that appears to be genuine to any entity or communication requesting service within the network system 100. Because it is more likely than not that a scanning technique will encounter a faked service prior to encountering a real service, rules usually can be generated by the analysis engine 140 prior to the malicious payload striking a real service.

Figure 8:
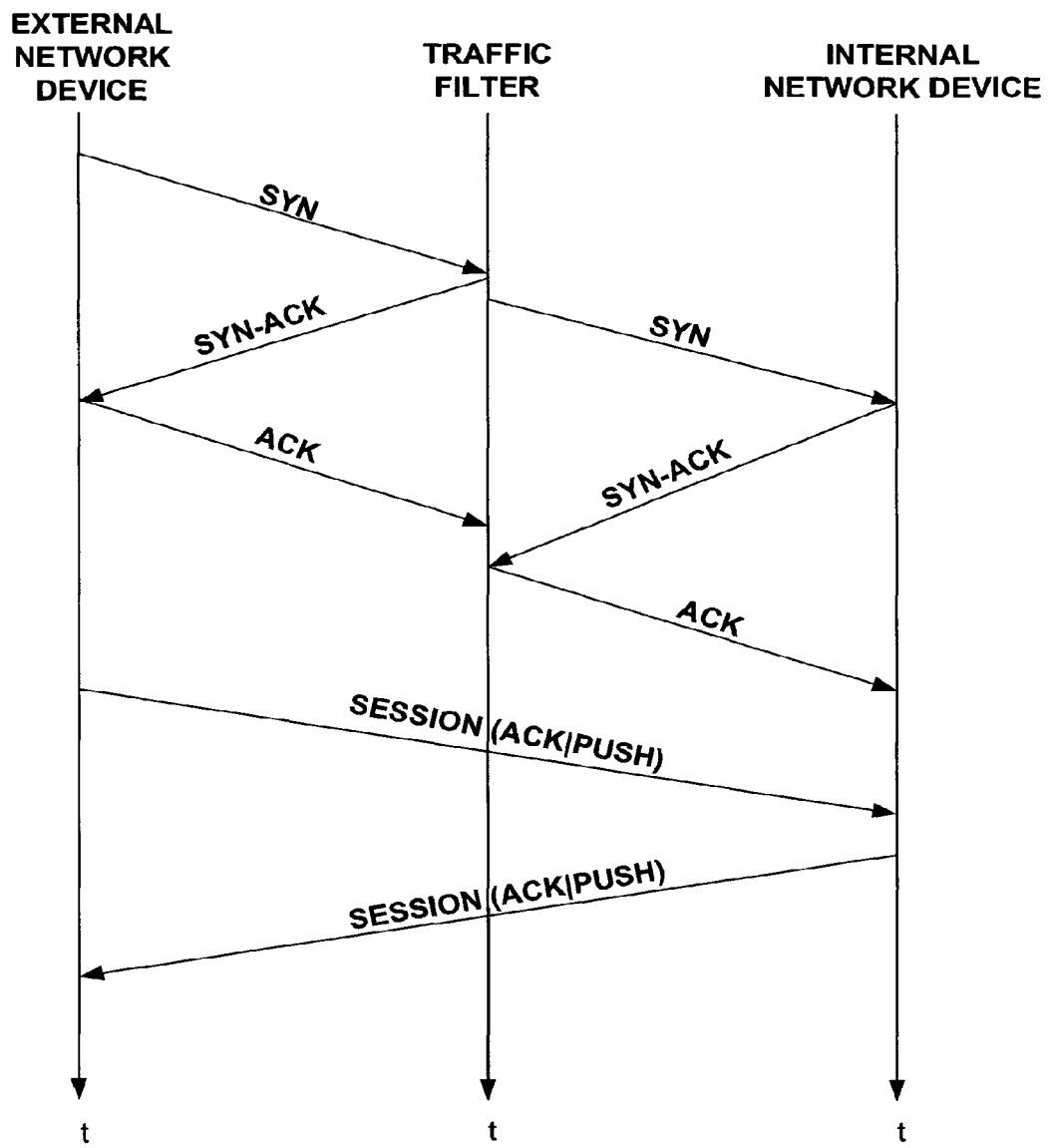
FIG. 8 is a diagram showing signals used for handling communications when a requested service exists within a network, according to an embodiment of the invention.

FIG. 8 is a diagram showing signals used for handling communications when a requested service exists within a network system 100, according to an embodiment of the invention. Because the service requested in FIG. 8 exists within the network system 100, the signals illustrated in FIG. 8 correspond to normal communication handling by the traffic filter 110. In FIG. 8, three timelines are shown concurrently for three different corresponding devices. On the left-hand side of FIG. 8, a timeline corresponding to an external network device (e.g., a device external to the network system 100) is illustrated. The center timeline corresponds to the traffic filter 110 of the network system 100, and the timeline on the right-hand side of FIG. 8 corresponds to an internal network device 120 within the network system 100.

Normal communications proceed as the external network device initiates communication with the traffic filter by sending a synchronization (SYN) signal. The traffic filter receives the synchronization signal and transmits an acknowledgment and synchronization signal of its own (SYN-ACK). The external network device, in turn, acknowledges the synchronization signal sent by the traffic filter 110, by sending an acknowledgment signal (ACK) of its own.

While the initial handshake between the external network device and the traffic filter 110 progresses, the traffic filter 110 transmits a synchronization signal to one or more devices 120 within the network system 100 that correspond to the service requested by the external network device in the synchronization signal. Because the service exists within the network system 100, and the request can be serviced by one of the device 120 of that network system 100, an acknowledgment is sent in combination with a synchronization signal from the internal network device 120. The traffic filter 110 in turn acknowledges the synchronization signal of the internal network device 120.

Once the handshake procedure between the traffic filter 110 and the internal network device 120 has completed, the network system 100 is ready to receive any communications from the external network device. Those communications are begun, and data is transmitted using in the form of a SESSION (ACK/PUSH) signal. Similarly, the same type of data signal, containing data transmitted from the internal network device to the external network device is transmitted in response. This process continues until all data intended to be transmitted has been transmitted.

Figure 9:
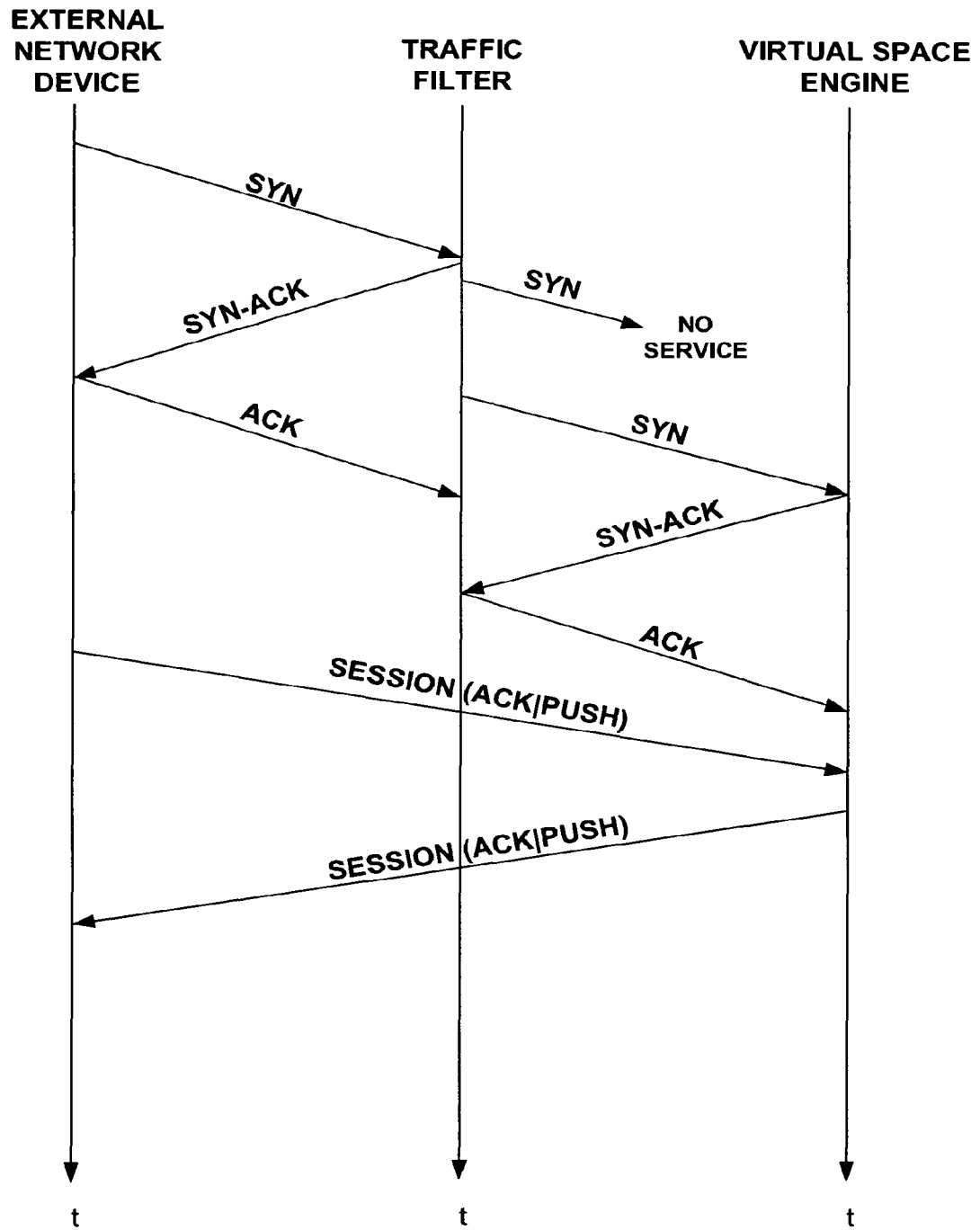
FIG. 9 is a diagram showing signals used for handling communications when a requested service does not exist within a network, according to an embodiment of the invention.

FIG. 9 is a diagram showing signals used for handling communications when a requested service does not exist within a network system 100, according to an embodiment of the invention. The signals illustrated in FIG. 9 differ from those illustrated in FIG. 8, in that the service requested by the external network device in FIG. 9 does not exist within the network system 100.

In FIG. 9, after the first synchronization signal is received from the external network device by the traffic filter 110, a synchronization signal is sent to the various devices within the network system 100. However, because the service does not exist, as illustrated by the "NO SERVICE" indication, the traffic filter's service request eventually times out. Because the time out is an anomaly, and because the traffic filter 110 recognizes that the requested service does not exist within the network system 100, the received communication is to be routed to the virtual space engine 130.

Thus, after the time out of the initial handshake attempt by the traffic filter 110, the traffic filter 110 begins the handshake process with the virtual space engine 130, which is similar to the handshake process between the traffic filter and a device 120 within the network system 100, as illustrated in FIG. 8. Although there is some delay associated with performing the handshake operations between the traffic filter 110 and the virtual space engine 130, by the time the initial data is to be transmitted from the external network device to the network system 100, the traffic filter 110 is prepared to pass that information to the virtual space engine 130, and the virtual space engine 130 is prepared to receive and handle that information, having completed its handshake operation with the traffic filter 110.

As illustrated in FIG. 9, the virtual space engine 130 continues to communicate with the external network device (e.g., using SESSION (ACK|PUSH signals)), in response to the anomalous received communication, despite the fact that the network system 100 and its devices 120 do not support the requested service. The ability of the virtual space engine 130 specifically, and the network system 100 generally to handle anomalous communications as if they were normal and/or expected communications received by the network system 100, is advantageous, and helps allow traits of the network system 100 and the various components thereof to remain undetected. Additionally, if the communications from the external network device are malicious, the virtual space engine will likely be able to entice the external network device into providing those malicious communications (e.g., delivering a malicious payload), whereupon the analytical engine 140 can be used to analyze and generate or update rules based on the received malicious communications.

Figure 10:
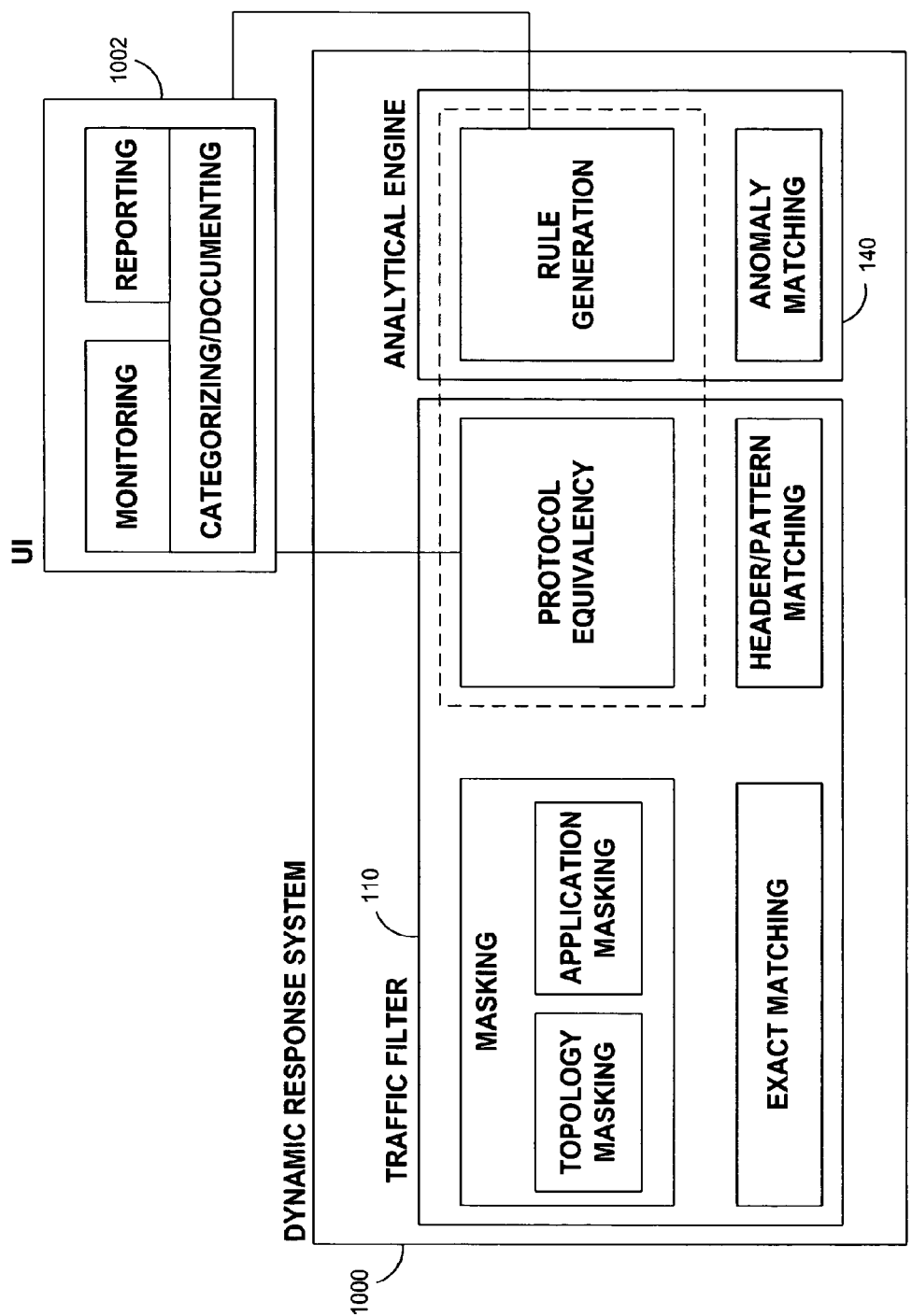
FIG. 10 is a block diagram functionality of system components, according to an embodiment of the invention.

FIG. 10 is a block diagram functionality of system components, according to an embodiment of the invention. In FIG. 10, some functionality described above is illustrated in the form of a dynamic response system 1000. The dynamic response system 1000 includes the functionality of the traffic filter 110, and the analytical engine 140.

The various functionalities of the dynamic response system 1000 can be accessed by a user interface (UI) 1002, such as a graphical user interface (GUI), or the like. The UI 1002 can include, for example, various functions desirable to a user of the dynamic response system 1000. For example, information from the dynamic response system can be categorized and/or documented, and can be monitored or reported via the UI 1002. The UI 1002 can access functions of both the traffic filter 110, and the analytical engine 140. For example, the UI can access the rule generation capability of the analytical engine 140, and the protocol equivalency capability of the traffic filter. Together these functions accessed by the UI 1002 can be used together (as indicated by the dashed box) by applying standard linear equations to determine equivalent protocol communications. It is this capability that allows the dynamic response system 100 to respond dynamically, or in other words, to change communications, filtering out harmful, malicious, divulgent, or other undesirable communications traits in real time, during communications while maintaining equivalent communications information.

As illustrated in FIG. 10, the traffic filter 110 includes the protocol equivalency functionality, as well as a masking capability, which can include both technology masking, as discussed in connection with FIG. 6, and application masking, as discussed in connection with FIG. 7. The analytical engine 140 can include, for example, anomaly matching, and the traffic filter can include header and/or pattern matching, as well as exact matching, or trivial matching. For example, exact matching can be used by the traffic filter 110 for specific, known, communications, which are undesirable to be received within the network system 100 of FIG. 1, and can be especially useful when it is difficult to generate rules other than an exact match for detection.

Figure 11:
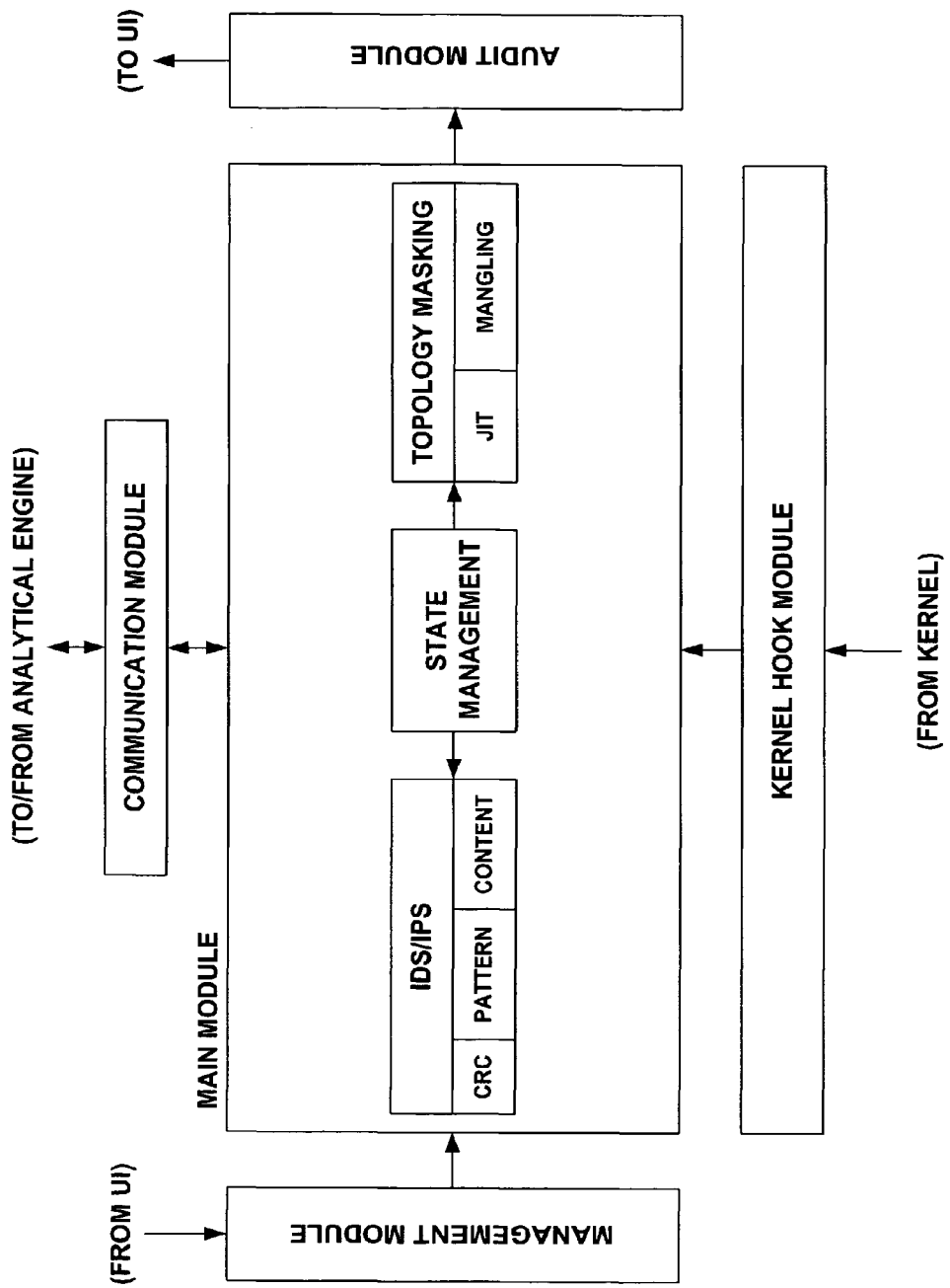
FIG. 11 is a block diagram of code blocks, according to an embodiment of the invention.

FIG. 11 is a block diagram of code blocks, according to an embodiment of the invention. Specifically, the code blocks illustrated in FIG. 11 can be used to implement the traffic filter 110 shown in FIG. 1, according to one or more embodiments of the invention. Additionally, or alternatively, the code blocks illustrated in FIG. 11 can be used too implement the functionality shown in FIG. 5 and described above in connection with that figure. For example, a kernel hook module is used by the traffic filter 110 to capture packets received by the network system 100, and to manipulate those packets at a kernel level.

A communication module of the traffic filter 110 is provided for communications to and from the analytical engine 140. For example by way of the communication module, the traffic filter 110 is able to transmit anomalous and/or normal communications to the analytical engine 140 or receive information therefrom (e.g., new or updated rules). The communication module can be, for example, one or more communications application program interfaces (APIs) configured to provide communications to and from the traffic filter 110 either unidirectionally or bidirectionally, as desired.

A management module is provided as an interface between traffic filter 110 and a system administrator (e.g., accessing the system via a user interface, etc.), and can allow a system administrator to manage rules of the traffic filter 110, set system parameters, and/or read system logs. Additionally, an audit module is provided, and can communicate with a user interface. The audit module is configured to log activity of the traffic filter 110 and the analytical engine 140 so that all received traffic can be analyzed, if desired, to observe what types of tokens are being generated, and to analyze what actions are being taken by the traffic filter 110.

A main module is provided, and includes multiple submodules, such as state management, intrusion detection systems (IDS)/intrusion protection systems (IPS) and topology masking modules. The IDS/IPS module includes basic intrusion detection and protection capabilities, including cyclical redundancy checking (CRC) for computing and blocking CRCs. The IDS/IPS module can also include pattern and content checking modules, which can search certain patterns and/or contents, respectively, of a communication data stream.

A state management module is configured to record every TCP session and to serve as a central data repository for ongoing TCP connections. Additionally, a typology masking module is provided, and can include a just in time (JIT) module that is configured to act as a synchronization (SYN) proxy and redirects scanning requests to a decoy or honeypot component. Additionally, the typology masking module can include a mangling module, which is configured to modify the payloads of various received packets to remove network traits and provide only apparent traits. For example, the mangling module might remove system specific strings, such as an HTTPD version number, or other specific information that could potentially be used to learn about a network or its devices.

Figure 12:
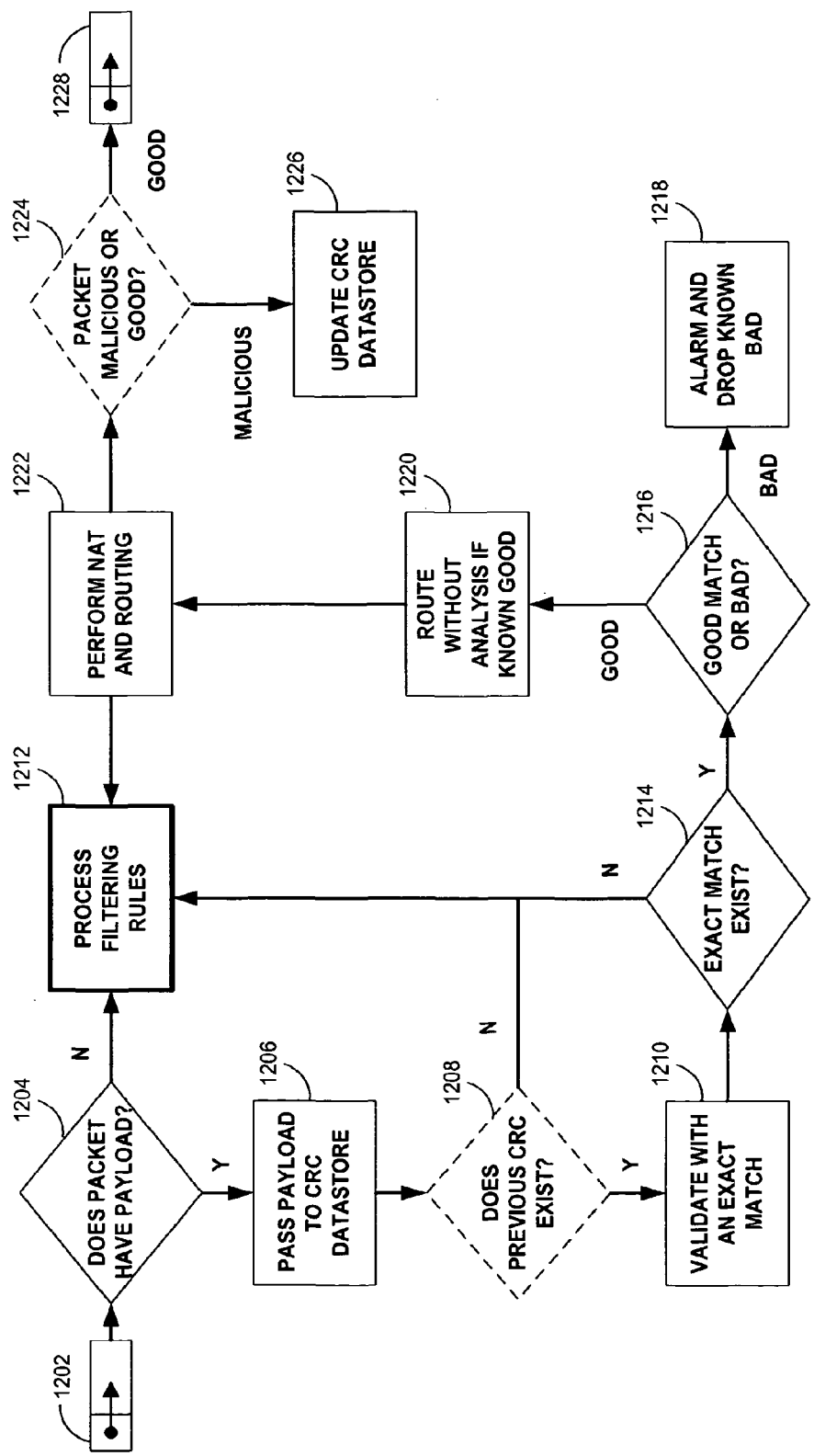
FIG. 12 is a flow diagram showing operations associated with exact payload matching, according to an embodiment of the invention.

FIG. 12 is a flow diagram showing operations associated with exact payload matching, according to an embodiment of the invention. Exact payload matching can be used according to one or more embodiments of the invention as a categorization technique. For example, communication payloads can be categorized by an exact match of the content of the payload by associating the content with a destination port of a determined protocol to improve accuracy. Because a significant number of redundant packets interact with network services, many of these packets can be categorized without further computation once a payload match has been established. One or more embodiments of the invention is capable of implementing an exact match quickly by hashing the content of the payload (e.g., using a suitable algorithm such as CRC32, etc.) and only matching bits when there is a possible match. Such an approach can improve the categorization speed on networks with common communications traffic.

The flow diagram shown in FIG. 12 is an example of CRC Analysis that can be performed to determine exact payload matches according to an embodiment of the invention. In FIG. 12, and unknown inbound communication packet 1202 is received and a determination is made in operation 1204 regarding whether or not the packet 1202 has a payload. If it is determined that the packet 1202 has a payload, then the payload is passed to a CRC datastore in operation 1206, which can include performance of a CRC and can return a pointer to a payload link list (or to NULL) if no CRC exists, according to one or more embodiments of the invention. If it is determined in operation 1204 that no payload exists, then filtering rules are processed in operation 1212.

A optional determination can be made in operation 1208 regarding whether a previous CRC exists. If it is determined that a previous CRC does exist, then the CRC is validated with an exact match in operation 1210. If it is determined in operation 1208 that no previous CRC exists, then the filtering rules are processed in operation 1212. After a CRC is validated with an exact match in operation 1210, a determination is made in operation 1214 regarding whether an exact match exists. If an exact match exists, a determination is made in operation 1216 regarding whether the match is a known good packet or a known bad packet, as discussed below. If an exact match does not exist, then the filtering rules are processed in operation 1212.

In operation 1216, a determination regarding whether a CRC match validated in operation 1210 is a known good packet or a known bad packet. If the matching packet is a known bad packet, an alarm is generated and the known bad packet is dropped in operation 1218. If, on the other hand, the matching packet is a known good packet, then the packet 1202 is routed without analysis in operation 1220. Once a the packet is routed in operation 1220, then network address translation (NAT) and routing is performed in operation 1222, after which the filtering rules can be processed in operation 1212.

An optional determination can be made in operation 1224 regarding whether the packet 1202 is malicious or good. If the packet is determined to be malicious, the CRC datastore is updated in operation 1226 and other devices on the network can be informed that the packet is malicious (e.g., devices to which the packet may have previously been transmitted). If the packet is determined to be good in operation 1224, then the an outbound packet 1228 is generated based on the inbound packet 1202, and the outbound packet is sent to the correct location (e.g., a device within a network to which the inbound packet 1202 was addressed).

The payload matching shown in FIG. 12 can be implemented, for example, as a binary-tree whose key is an unsigned integer (e.g., 32 bits) that is the CRC value (e.g., CRC32). Each node of the binary-tree, according to one or more embodiments of the invention can point to the link list of packets that match this CRC. A link list can contain a list of payloads, when they were added (e.g., using a timestamp), and if they are good, bad, or neutral. If no packet is found in a match validation operation 1210, the operation can return a neutral, which is the same as not finding a packet.

Figure 13:
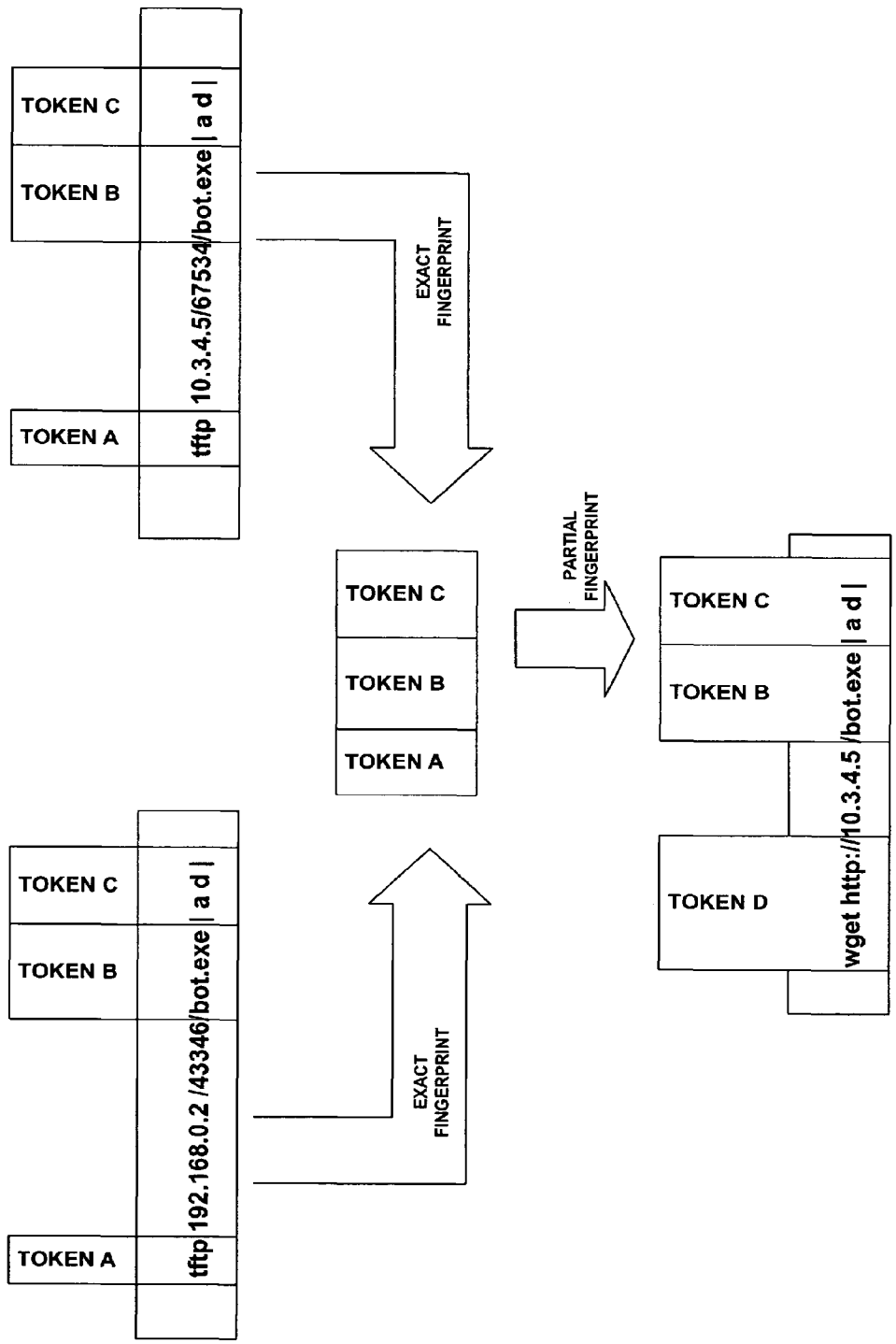
FIG. 13 is a block diagram showing various elements associated with partial fingerprint matching, according to an embodiment of the invention.

FIG. 13 is a block diagram showing various elements associated with partial fingerprint matching, according to an embodiment of the invention. Generally, generated tokens and their sequences define a fingerprint, which can be used to categorize a payload, stream, or communication. Exact fingerprint matching is similar to matching the tokens exactly, but also allows for variations, such as where certain data (e.g., time, address, etc.) make an exact match impossible or impractical. According to one or more embodiments of the invention, fingerprint matching uses key markers (e.g., statistically strong patterns) in a communication to determine categorization of the communication. For example, exact fingerprint matching can match a series of lexicons derived by a statistical pattern matching or recognition algorithm.

An exact fingerprint is a series of tokens that are an exact match of another series. The matches are exact in that they have the same number of tokens and the tokens are in the same order. For example, in FIG. 13, the two statements at the top of the page contain the same tokens that are in the same order (i.e., Token A, Token B, and Token C). Thus, the fingerprints of these two statements. According to an embodiment of the invention, an exact match that is always associated with anomalous communications can be determined to be undesirable by the analytical engine 140 and filtered out by the traffic filter 110. Thus, for example, if the statement shown in the top-left portion of FIG. 13, is known by the analytical engine 140 to be an anomalous communication (e.g., requests a service that does not exist on the network system 100), then the statement in the top-right portion of the figure can also be deemed to be anomalous by the analytical engine 140, because it includes the same tokens (Token A, Token B, and Token C) in the same order.

On the other hand, a partial fingerprint, as illustrated in FIG. 13 is different from exact fingerprint; however matching can also be accomplished using partial fingerprint matching. For example, when other streams have been determined to display a subset of several exact fingerprints, then the analytical engine can mark those subsets as partial fingerprints. For example, the statement in the lower portion of FIG. 13 includes two of the three tokens of the two statements in the upper portion of that figure (i.e., Token B and Token C), and they appear in the same order in which they appeared in the statements above. Thus, based on this partial fingerprint a possible match exists between the statement in the lower portion of FIG. 13 and the statements in the upper portion of that figure.

Partial fingerprints can be developed using "chunks" according to an embodiment of the invention, which are similar to segments achieved by "chunking" in the natural language processes. Chunks are patterns in the exact fingerprints that repeat themselves in other, similar communications. For example, a request of a browser can be an attack, but each browser's options are different and therefore there are a number of different exact fingerprints that are substantially the same attack. Because each request has different browser headers, however, each request has a different exact fingerprint that performs the same task. The fingerprint of the request packet will generate the same partial fingerprint, but it is only part of an overall fingerprint. The more chunks that appear in a pattern, the better the ability of the analytical engine 140 to categorize the communication based on the chunks or partial fingerprints. In FIG. 13, for example, the combination of Token B followed by Token C is a chunk that is repeated from the statements in the upper portion of FIG. 13 to the statement in the lower portion of FIG. 13, and can be used to identify similarities between the statements.

If there is no match for a communication, and there are a number of chunks, the analytical engine 140, or another component of the network system 100 shown in FIG. 1, can make a statistical categorization of the communication based on the chunks. This can be done, for example, by determining what categories of previous communications contain these chunks. If a category does not include all of the chunks discovered, it is removed from the list of possibilities. The remaining categories are the likely ones to which the communication belongs. If the remaining categories are bad (e.g., communications that are desirable to be stopped or re-routed), then such an action can be taken and, if desired, rules associated with the communication can be generated by the analytical engine 140.

Figure 14:
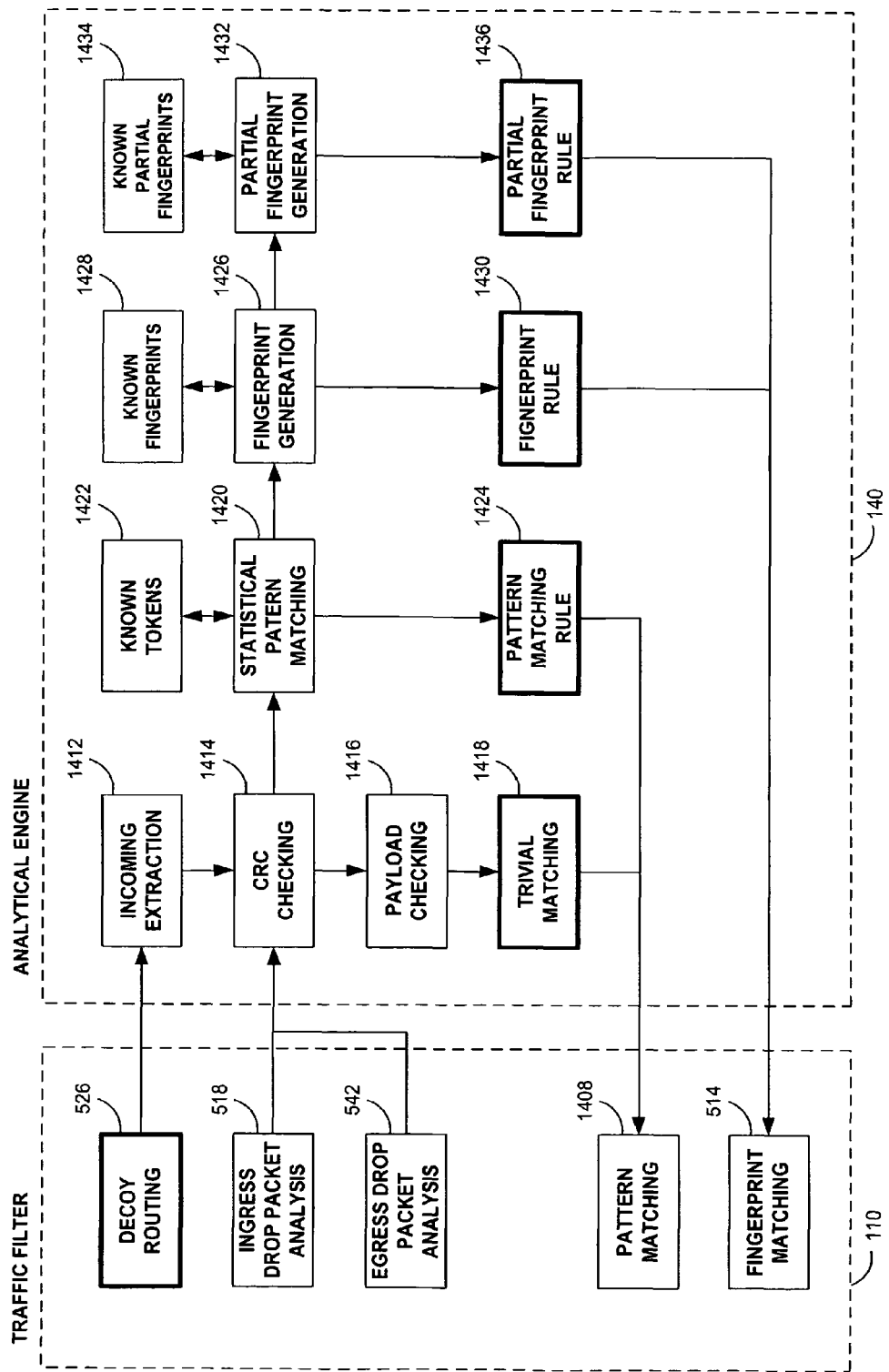
FIG. 14 is a block diagram showing various elements associated with an analytical engine, according to an embodiment of the invention.

FIG. 14 is a block diagram showing various elements associated with an analytical engine, according to an embodiment of the invention. In FIG. 14, some of the various functions of the traffic filter 110 and the analytical engine 140 and interactions between them are shown. For example, the traffic filter 110 includes the capability of performing decoy routing 526, ingress drop packet analysis 518, egress drop packet analysis 542, pattern matching 1408, and fingerprint matching 514. The Analytical engine has four categories of analysis capabilities or analytical engines: trivial matching, pattern matching or single-token matching, exact fingerprint matching, or partial fingerprint matching.

The decoy routing functionality 526 of the traffic filter 110 is configured to communicate to the incoming extraction module 1412 of the analytical engine 140. The ingress drop packet analysis 518 and the egress drop packet analysis 542 are configured to communicate with the CRC checking 1414 capability of the analytical engine 140. Any incoming communications that are processed by the incoming extraction module 1412 have CRC checking 1414 performed on them. After CRC checking 1414, the payload can be checked by the payload checking 1416 capability of the analytical engine 140, and any trivial or exact matching can be performed by the trivial checking functionality of the analytical engine 140. Results of trivial matching 1418 are passed to the pattern matching 1408 function of the traffic filter 110.

Trivial matches occur when an exact payload match is determined by the trivial matching component 1418 of the analytical engine 140. Many attacks are static, and do not create a diverse results for a learning system, such as the analytical engine 140. Thus, where there is no or little diversity in payloads of various communications, the payload itself can be used to determine a match. This matching can be referred to as a trivial rule.

Generally, many detection systems attempt to match only a subset of a payload because of speed considerations, despite the fact that the larger the match, the more accurate it is. In the case of a trivial rule, however, the analytical engine 140 performs the longest possible match: the entire payload. Thus, to speed up the payload comparison, the analytical engine 140 uses a hash checksum to create a low-collision index to the payload. If another payload arrives with the same checksum, but a different binary pattern, then the trivial rule module marks the collision and informs the analytical engine 140 when this collision changes the categorization. Alternatively, if such a collision occurs, the analytical engine 140 can examine each payload associated with the checksums in the index to determine if they are the same.

The matching module 1418 maintains a catalog of all recurring packets (e.g., their checksums) and their categorization. A priority queue can be used as a means of preventing a high number of rare payloads, removing them from the catalog when they are seldom used. This purging of old hashes can be done by both the traffic filter 110 and the analytical engine 140, which can synchronize maintenance of the catalog and index.

The analytical engine 140 can also perform statistical pattern matching 1420, and known tokens 1422 can be communicated with the statistical pattern matching function 1420. Any statistical patterns determined by the statistical pattern matching function 1420 can have a pattern matching rule 1424 applied to them. The results of the pattern matching rule function 1424 can be provided to the pattern matching function 1408 of the traffic filter 110.

Token generation is performed using the statistical pattern matching function 1420 of the analytical engine 140 to determine patterns, such as statistically strong patterns. These generated tokens can be stored as known tokens 1422, which can be retrieved by the statistical pattern matching function 1420 and applied to new communications received by the analytical engine 140.

According to one or more embodiments of the invention, the statistical pattern matching function 1420 can create a logical relationship between tokens and received communications. Additionally, the statistical pattern matching function 1420 can address tokens that have a small breadth of options (e.g., 8 bits), and can use a sliding window to create and/or analyze tokens. To prevent possibly splitting tokens, when a generated token is the same length as the window, the length of the window can be temporarily doubled for that token. Additionally, the statistical pattern matching function 1420 can use a variety of data structures, which can be changed, based on the density of the level of a logical relationship. For example, the data structure can change from a string representing many one-child levels, to a link list and/or to a a hash array. The statistical pattern matching function 1420 can maintain a marker of what dataset created a particular state. In this manner, both good and bad datasets enter information into the statistical pattern matching function 1420. When a token is determined, a trivial match check can be used to determine if the token is a member of both sets or only a particular set. Additionally, or alternatively, the statistical pattern matching function 1420 can generate a self-tested, strong token, which can be sufficiently strong to allow blocking of its occurrence and stop an attack, according to one or more embodiments of the invention.

The analytical engine 140 can perform fingerprint generation using the fingerprint generation function 1426, which can store and retrieve known fingerprints 1428. These fingerprints generated by the fingerprint generation function 1426 can be used to form or modify fingerprint rules 1430, which can be applied to any communication received by the analytical engine 140. Once fingerprint rules have been applied to a received communication, the fingerprint matching function 514 of the traffic filter 110 can be executed.

Exact fingerprinting by the fingerprint generation function 1426 can be useful when a single token is not sufficient, or when an attack is a combination of allowed tokens. Fingerprints, as mentioned above in connection with FIG. 13 are formed using a combination of all known tokens of a communication and their order. When attacks have a changing value (e.g., a different payload, a different IP address, etc.), fingerprints can determine the patterns around these values, allowing for discovery of a token combination that can be used to stop an attack. According to one or more embodiments of the invention, exact fingerprinting is reliable technique for stopping an attack.

The analytical engine 140 can perform partial fingerprint generation using the partial fingerprint generation function 1432, which can store and retrieve known partial fingerprints 1434 to be used by the analytical engine 140. The partial fingerprints determined by the partial fingerprint generation function 1432 can be used to develop partial fingerprint rules 1436, which can be applied by the analytical engine 140 on incoming communications. Results of the application of a partial fingerprint rule can be passed to the fingerprint matching 514 of the traffic filter 110.

According to one or more embodiments of the invention, two types of partial fingerprints can be used by the analytical engine 140: chunks and associations. As mentioned above in connection with FIG. 13, a Chunk is a series of tokens that occur in a particular order in a number of exact fingerprints. Chunks frequently occur and can, therefore, frequently be used by the analytical engine because patterns of tokens are common. For example, although there are different versions of Internet Explorer, all three major versions share certain chunks. Even when the header is changed, some of these chunks still exist, and can, therefore, still be detected by the analytical engine 140.

Associations are combinations of chunks. Finding a single chunk helps to determine a possible match. Many chunks are similar to many tokens, and can determine a more likely match. The more chunks that occur, the more likely that a relationship exists. Chunks can also be used to remove categories from possible categories. For example, if there are three chunks in a communication, only those categories that have all three chunks as possibilities may be considered.

Although not shown in FIG. 14, the analytical engine can perform self testing, as described above. For example, before a signature or rule is pushed from the analytical engine 140 to the traffic filter 110, it can be compared against previous communication traffic. If the pattern exists in previous communication traffic, then an operator can be informed (e.g., via a UI, such as the UI 1002 of FIG. 10) of the signature or rule failing the self-test, and the operator can proceed as desired.

According to one or more embodiments of the invention, a scan race condition can be allowed to pass the self-testing capability of the analytical engine 140. For example, it is possible that a scanning attack may hit a real system before it creates an anomaly or hits a decoy system. In such a case, the analytical engine can ignore occurrences in the immediate past, allowing a history of not seeing a pattern for a long period of time (e.g., during the last month) to override the fact that similar activity to a real system occurred shortly (e.g., during the last few minutes) before activity to a fake system or otherwise anomalous communications were detected. The time constraints on dealing with the scan race condition can be varied within the analytical engine as desired. For example, communications within the past five minutes can be further analyzed by the analytical engine 140 for the possibility of the scan race condition, according to an embodiment of the invention.

From the foregoing, it can be seen that systems and methods for verifying policy compliance are discussed. Specific embodiments have been described above in connection with a traffic filter and separate virtual space engine and analysis engines.

It will be appreciated, however, that embodiments of the invention can be in other specific forms without departing from the spirit or essential characteristics thereof. For example, while specific implementations have been described in connection with certain components, devices, and configurations, other configurations than the ones described herein can be used. Additionally, while certain types of anomalies have been described as being handled according to one or more embodiments of the invention, any anomalies that can be analyzed and from which rules for future security can be developed can be detected and addressed according to the principles of the invention.

The presently disclosed embodiments are, therefore, considered in all respects to be illustrative and not restrictive.

What is claimed is:

1. An apparatus, comprising:
a memory including code;
a processor communicatively coupled to the memory; and
logic communicatively coupled to the processor to:
receive a network communication from an external network via a traffic filter,
transmit a first synchronization signal to determine if the network communication is to be handled by a service that does not exist within a network associated with the traffic filter,
if the first synchronization signal times out, route the network communication to a virtual space engine, and generate a first response to the network communication including information about the network associated with the traffic filter that is not discernable from the first response,
determine whether a match of content of a payload of the network communication exists at least partially based on a validation of a cyclical redundancy check (CRC) of the payload, and
perform network address translation at least partially based on a determination that the match is a known good packet.

2. The apparatus of claim 1, wherein the logic removes network traits from internet protocol (IP) datagrams of the first response before a communication of the first response.

3. The apparatus of claim 1, wherein the logic generates a second response to a second network communication for a service, the second response being similar to a third response to a third network communication for the service on another device in the network associated with the traffic filter.

4. The apparatus of claim 1, wherein the logic generates the first response at least partially based on a comparison of the received network communication and a previously received communication handled by a service that exists within the network.

5. The apparatus of claim 1, wherein the logic modifies a payload of a packet to remove traits of the network and to provide apparent traits.

6. The apparatus of claim 5, wherein the apparent traits appear to provide a honeypot within the network associated with the traffic filter.

7. The apparatus of claim 1, wherein, if the network communication is to be handled by a service that exists within the network associated with the traffic filter, the logic acknowledges a second synchronization signal from an internal network device.

8. A method implemented by a device, the method comprising:
receiving a network communication from an external network via a traffic filter;

transmitting a first synchronization signal to determine, with the device, if the network communication is to be handled by a service that does not exist within a network associated with the traffic filter;

if the first synchronization signal times out, routing the network communication to a virtual space engine, and generating a first response to the network communication including information about the network associated with the traffic filter that is not discernable from the first response;

determining whether a match of content of a payload of the network communication exists at least partially based on a validation of a cyclical redundancy check (CRC) of the payload; and performing network address translation at least partially based on a determination that the match is a known good packet.

9. The method of claim 8, wherein the generating removes network traits from internet protocol (IP) datagrams of the first response before a communication of the first response.

10. The method of claim 8, wherein the generating generates a second response to a second network communication for a service, the second response being similar to a third response to a third network communication for the service on another device in the network associated with the traffic filter.

11. The method of claim 8, wherein the generating generates the first response at least partially based on a comparison of the received network communication and a previously received communication handled by a service that exists within the network.

12. The method of claim 8, further comprising:
modifying a payload of a packet to remove traits of the network and to provide apparent traits.

13. The method of claim 8, further comprising:
if the network communication is to be handled by a service that exists within the network associated with the traffic filter, acknowledging a second synchronization signal from an internal network device.

14. A non-transitory, processor-readable medium comprising code representing instructions to cause a processor to perform:
receiving a network communication from an external network via a traffic filter;
transmitting a first synchronization signal to determine if the network communication is to be handled by a service that does not exist within a network associated with the traffic filter;
if the first synchronization signal times out, routing the network communication to a virtual space engine, and generating a first response to the network communication including information about the network associated with the traffic filter that is not discernable from the first response;
determining whether a match of content of a payload of the network communication exists at least partially based on a validation of a cyclical redundancy check (CRC) of the payload; and
performing network address translation at least partially based on a determination that the match is a known good packet.

15. The non-transitory, processor-readable medium of claim 14, wherein the generating removes network traits from internet protocol (IP) datagrams of the first response before a communication of the first response.

16. The non-transitory, processor-readable medium of claim 14, wherein the generating generates a second response to a second network communication for a service, the second response being similar to a third response to a third network communication for the service on another device in the network associated with the traffic filter.

17. The non-transitory, processor-readable medium of claim 14, wherein the generating generates the first response at least partially based on a comparison of the received network communication and a previously received communication handled by a service that exists within the network.

18. The non-transitory, processor-readable medium of claim 14, the code further representing instructions to cause the processor to perform:
modifying a payload of a packet to remove traits of the network and to provide apparent traits.

19. The non-transitory, processor-readable medium of claim 18, wherein the apparent traits appear to provide a honeypot within the network associated with the traffic filter.

20. The non-transitory, processor-readable medium of claim 14, the code comprising representing instructions to cause the processor to perform:
if the network communication is to be handled by a service that exists within the network associated with the traffic filter, acknowledging a second synchronization signal from an internal network device.

21. The non-transitory, processor-readable medium of claim 14, the code further representing instructions to cause the processor to perform:
informing a device on the network to which the network communication was previously transmitted, if the network communication is determined to be malicious.

* * * * *

UNITED STATES PATENT AND TRADEMARK OFFICE
CERTIFICATE OF CORRECTION

PATENT NO. : 9,800,548 B2
APPLICATION NO. : 14/486740
DATED : October 24, 2017
INVENTOR(S) : Christopher J. Jordan It is certified that error appears in the above-identified patent and that said Letters Patent is hereby corrected as shown below:

On the Title Page

In item (57), in Column 2, in "Abstract", Line 2, delete "described, network" and insert -- described. Network --, therefor.

In item (57), in Column 2, in "Abstract", Line 8, delete "he" and insert -- the --, therefor.

In the Drawings

On sheet 14 of 14, in Figure 14, reference numeral 1420, Line 2, delete "PATERN" and insert -- PATTERN --, therefor.

On sheet 14 of 14, in Figure 14, reference numeral 1430, Line 1, delete "FIGNERPRINT" and insert -- FINGERPRINT --, therefor.

In the Claims

In Column 34, Line 38, in Claim 20, delete "comprising" and insert -- further --, therefor.

Signed and Sealed this
Twentieth Day of February, 2018

Andrei Iancu
*Director of the United States Patent and Trademark Office*